(12) United States Patent
Teyeb et al.

(10) Patent No.: US 11,751,047 B2
(45) Date of Patent: Sep. 5, 2023

(54) HOP BY HOP SECURITY IN IAB NETWORKS

(71) Applicant: Telefonaktiebolaget LM Ericsson (publ), Stockholm (SE)

(72) Inventors: Oumer Teyeb, Solna (SE); Gunnar Mildh, Sollentuna (SE); Prajwol Kumar Nakarmi, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 79 days.

(21) Appl. No.: 17/431,802

(22) PCT Filed: Jan. 3, 2020

(86) PCT No.: PCT/IB2020/050034
§ 371 (c)(1),
(2) Date: Aug. 18, 2021

(87) PCT Pub. No.: WO2020/174291
PCT Pub. Date: Sep. 3, 2020

(65) Prior Publication Data
US 2022/0150691 A1 May 12, 2022

Related U.S. Application Data

(60) Provisional application No. 62/809,960, filed on Feb. 25, 2019.

(51) Int. Cl.
*H04W 12/03* (2021.01)
*H04W 12/106* (2021.01)
(52) U.S. Cl.
CPC ......... *H04W 12/03* (2021.01); *H04W 12/106* (2021.01)

(58) Field of Classification Search
CPC ..... G06F 21/71; H04L 63/123; H04L 9/0643; H04L 63/0428; H04W 12/106;
(Continued)

(56) References Cited

U.S. PATENT DOCUMENTS

| 2011/0158410 A1* | 6/2011 | Falk | H04W 12/033 380/270 |
| 2013/0254557 A1* | 9/2013 | Garay | G06F 21/71 713/190 |

(Continued)

FOREIGN PATENT DOCUMENTS

| CA | 2470697 A1 * | 12/2005 | ............. H04L 9/002 |
| JP | 2008131654 A * | 6/2008 | ......... H04L 63/0457 |
| WO | WO-2018085290 A1 * | 5/2018 | ............. H04W 12/02 |

OTHER PUBLICATIONS

International Search Report and Written Opinion dated Mar. 6, 2020 for International Application No. PCT/IB2020/050034 filed Jan. 3, 2020, consisting of 11—pages.
(Continued)

*Primary Examiner* — Lizbeth Torres-Diaz
(74) *Attorney, Agent, or Firm* — Christopher & Weisberg, P.A.

(57) ABSTRACT

A method and apparatus for a first IAB node for securely communicating with at least one second IAB node is provided. A secure connection with a node of a network is established. A message is received, from the node, indicating a secure messaging protocol to use to communicate with the at least one second IAB node, the message including one of at least one nonce or a key. A control message to be sent to the at least one second IAB node is transformed into a secure control message using the secure messaging protocol. The secure control message is transmitted to the at least one second IAB node.

18 Claims, 20 Drawing Sheets

---

Using a nonce of the at least one nonce to protect an integrity of the control message to be transmitted to the at least one second IAB node
1402

Transmitting the secure control message with the nonce to the at least one second IAB node
1404

(58) Field of Classification Search
CPC ... H04W 12/03; H04W 12/10; H04W 12/108; H04W 12/102; H04W 12/033; H04W 12/06
See application file for complete search history.

(56) References Cited

U.S. PATENT DOCUMENTS

2022/0159465 A1* 5/2022 Shrestha ........... H04W 12/0431
2022/0159768 A1* 5/2022 Zhu ................... H04L 1/1642

OTHER PUBLICATIONS

3GPP TSG SA WG3 (Security) Meeting #93 S3-183706 revision of S3-18xabc; Title: LS on IAB security; Agenda Item: 6.1; Source: 3GPP RAN2; Document for: Information, Discussion; Date and Location; Nov. 12-16, 2018, Spokane (US), consisting of 4—pages.
3GPP TS 38.401 V15.4.0; 3rd Generation Partnership Project; Technical Specification Group Radio Access Network; NG-RAN; Architecture description (Release 15), Dec. 2018, consisting of 40—pages.
3GPP TR 38.874 V16.0.0; 3rd Generation Partnership Project; Technical Specification Group Radio Access Network; NR; Study on Integrated Access Backhaul; (Release 16), Dec. 2018, consisting of 111—pages.
E. Rescorla; The Transport Layer Security (TLS) Protocol Version 1.3 draft-ietf-tls-tls13-13; Network Working Group Internet—Draft; IETF Trust, May 22, 2016, consisting of 119—pages.
E. Rescorla et al.; Datagram Transport Layer Security Version 1.2; Internet Engineering Task Force (IETF); Request for Comments 6347; IETF Trust, Jan. 2012, consisting of 32—pages.
ETSI TS 133 501 V15.2.0; 5G; Security architecture and procedures for 5G System (3GPP TS 33.501 version 15.2.0 Release 15), Oct. 2018, consisting of 172—pages.

* cited by examiner

IAB node integration procedure

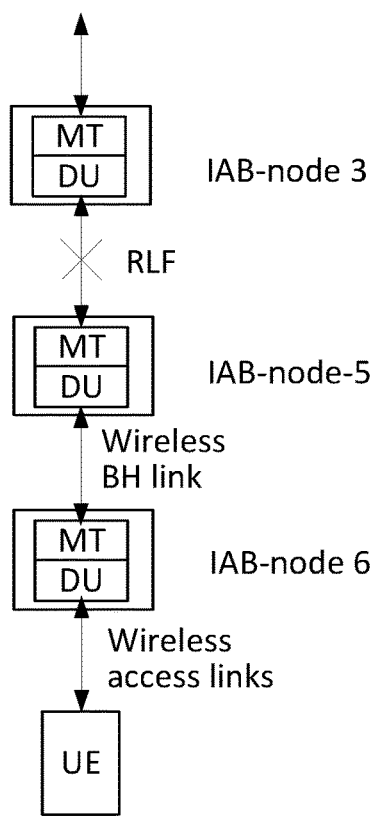
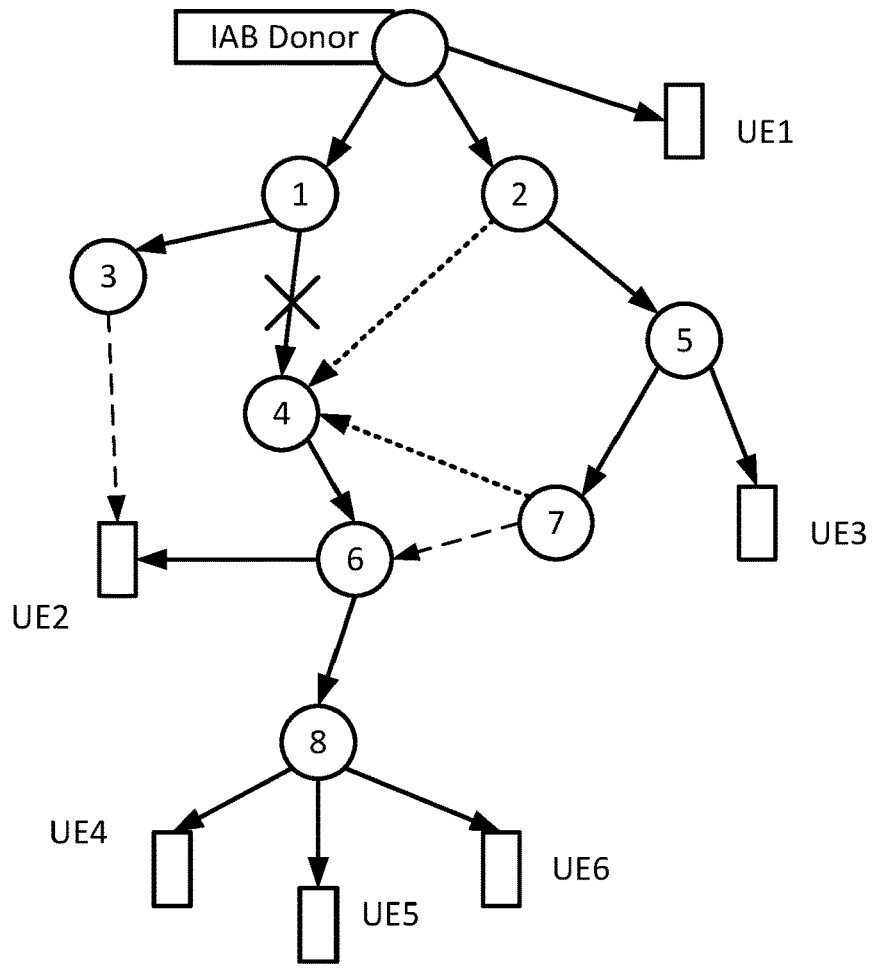
FIG. 9
FIG. 10

HOP BY HOP SECURITY IN IAB NETWORKS

CROSS-REFERENCE TO RELATED APPLICATIONS

This application is a Submission Under 35 U.S.C. § 371 for U.S. National Stage Patent Application of International Application No.: PCT/IB2020/050034, filed Jan. 3, 2020 entitled "HOP BY HOP SECURITY IN IAB NETWORKS," which claims priority to U.S. Provisional Application No.: 62/809,960, filed Feb. 25, 2019, entitled "HOP BY HOP SECURITY IN IAB NETWORKS," the entireties of both of which are incorporated herein by reference.

TECHNICAL FIELD

The present disclosure is related to communication systems and more particularly to how messages are communicated between integrated access and wireless access backhaul nodes.

BACKGROUND

3GPP is studying potential solutions for efficient operation of integrated access and wireless access backhaul (IAB) in new radio (NR) also known as relaying where the NR radio base station (called IAB node) provide access to end user UEs (wireless devices) and at the same time uses wireless backhaul to connect to another NR base station.

IAB strives to use existing functions and interfaces defined for access. In particular, Mobile-Termination (MT), generation node B distributed unit, gNB-DU, generation node B central unit, gNB-CU, user plane function, UPF, access and mobility function, AMF, and session management function, SMF, as well as the corresponding interfaces NR Uu (between MT and gNB), F1, NG, X2 and N4 may be used as baseline for the IAB architectures. Modifications and/or enhancements to these functions and interfaces for the support of IAB will be explained in the context of the architecture discussion. Additional functionality such as multi-hop forwarding is included in the architecture discussion as it is necessary for the understanding of IAB operation.

The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor may be treated as a single logical node that comprises a set of functions such as gNB-DU, gNB-CU control plane, gNB-CU-CP, gNB-CU user plane, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised.

FIGS. 2A-2E illustrate architectures studied to implement IAB. 3GPP TR 38.874 provides further details of these architectures. The differences between these architectures were analyzed during a study item phase of IAB specifications, A decision was made to standardize using the architecture illustrated in FIG. 2A. The proposed user plane (UP) and control plane (CP) protocol stacks for the selected architecture is shown in FIGS. 3 and 4.

As shown in FIGS. 3 and 4, the chosen protocol stacks reuse the current CU-DU split specification in rel-15, where the full F1-U (GTP-U/UDP/IP) is terminated at the IAB node (like a normal DU) and the full F1-C (F1-AP/SCTP/IP) is also terminated at the IAB node (like a normal DU). In the above cases, Network Domain Security (NDS) has been employed to protect both UP and CP traffic (IPsec in the case of UP, and datagram transport layer security, DTLS, in the case of CP). IPsec could also be used for the CP protection instead of DTLS.

One commonality between the CP and UP protocol stacks is that a new layer, called adaptation layer (and abbreviated as "Adapt" in FIGS. 3 and 4), has been introduced in the intermediate IAB nodes and the IAB donor, which is used for routing of packets to the appropriate downstream/upstream node and also mapping the UE bearer data to the proper backhaul RLC channel (and also between backhaul RLC channels in intermediate IAB nodes) to satisfy the end to end QoS requirements of bearers.

Some highlights about the operation of the transmitter and receiver side shall be described.

PDCP (packet data convergence protocol)

The PDCP entity receives PDCP service data units, SDUs, from higher layers and these SDUs may be assigned a Sequence Number, SN, and be delivered to lower layers (i.e. radio link control, RLC). The discardTimer is started at the time a PDCP SDU is received. When the discardTimer expires, the PDCP SDU is discarded and a discard indication is sent to lower layers. The RLC, when possible, will then discard the RLC SDU.

In the receiver side, the PDCP entity starts the t-reordering when it receives packets that are out-of-order. When the t-reordering expires, the PDCP entity updates the variable RX_DELIV, which indicates the value of the first PDCP SDU not delivered to the upper layers, i.e., the variable RX_DELIV indicates the lower side of the receiving window.

RLC

In the transmitter side, when an RLC SDU is received from higher layers a SN is associated to it. The transmitter may set the poll bit to request the receiver side to transmit a status report. When this poll bit is set, the t-pollRetransmit timer is started. Upon expiration of this timer, the transmitter will set again the poll bit and may further retransmit those protocol data units, PDUs, which were awaiting to be acknowledged.

The receiver, on the other hand, may start the t-reassembly when RLC PDUs are not received in sequence. The t-reassembly function is similar as the t-reordering in PDCP. The timer is started when there is a SN gap i.e. a RLC PDU is missing. When t-reassembly expires, for AM, the receiver will transmit a status report to trigger a retransmission in the transmitter side.

MAC

When the UE has data to be transmitted, it will request for a grant by means of the SR or BSR.

SUMMARY

With backhaul failure recovery, flow control flow control feedback, etc., there may be a need to send a control message directly between two IAB nodes. There is no specified interface between the IAB nodes (i.e. DUs). Thus, it is likely that these messages are sent by including message information in an adaptation layer header or using other lower layer mechanisms, such as a MAC CE (MAC control element), which currently does not support any security mechanisms.

The problem with including message information via adaptation layer header or using other lower layer mechanism is that the messages are not secure, and an intruder/attacker can sabotage the system. For example, an intruder can inject a fake packet that indicates a backhaul link failure and force an IAB node to perform re-establishment to another node. An intruder may inject a flow control message to an IAB node, forcing the IAB node to stop or throttle its UL transmission (and corresponding SRs/BSR) to a parent node. These examples of attacks can cause severe disturbances to the end user service. Since the IAB node aggregates the data for several UEs (and also other IAB nodes), ensuring that control signaling such as backhaul link failure indications and flow control are secure prevents an intruder from being able to cause the loss of connection or degradation of performance of a multitude of UEs.

According to some embodiments of inventive concepts, a method is provided for a first integrated access and backhaul, IAB, node to securely communicate with at least one second IAB node. The method includes establishing a secure connection with a node of a network. The method further includes receiving, from the node, a message indicating the secure messaging protocol to use to communicate with the at least one second IAB node, the message including one of at least one nonce or a key. The method further includes transforming a control message to be sent to the at least one second IAB node into a secure control message using the secure messaging protocol. The method further includes transmitting the secure control message to the at least one second IAB node.

The advantages provided by the inventive concepts described herein that provide mechanisms for IAB nodes to communicate directly with each other in a secure way prevents attacks against the IAB node. The mechanisms preventing the attacks reduce the severity of consequences to end users served by the IAB nodes.

According to some other embodiments of inventive concepts, an integrated access and backhaul (IAB) node for securely communicating with at least one second IAB node is provided. The IAB node is adapted to perform operations including establishing a secure connection with a node of a network. The operations further include receiving, from the node, a message indicating the secure messaging protocol to use to communicate with the at least one second IAB node, the message including one of at least one nonce or a key. The operations further include transforming a control message to be sent to the at least one second IAB node into a secure control message using the secure messaging protocol. The operations further include transmitting the secure control message to the at least one second IAB node.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 9 is a block diagram of a topology with multiple IAB-node generations below back haul radio link failure, BH RLF FIG. 10 is an illustration of an example for a recovery after BH RLF in an IAB network.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. For example, some of the functions presently associated with the IAB-donor or the IAB node may be moved outside of the donor or node in case it becomes evident that they do not perform IAB-specific tasks.

Figure 11:
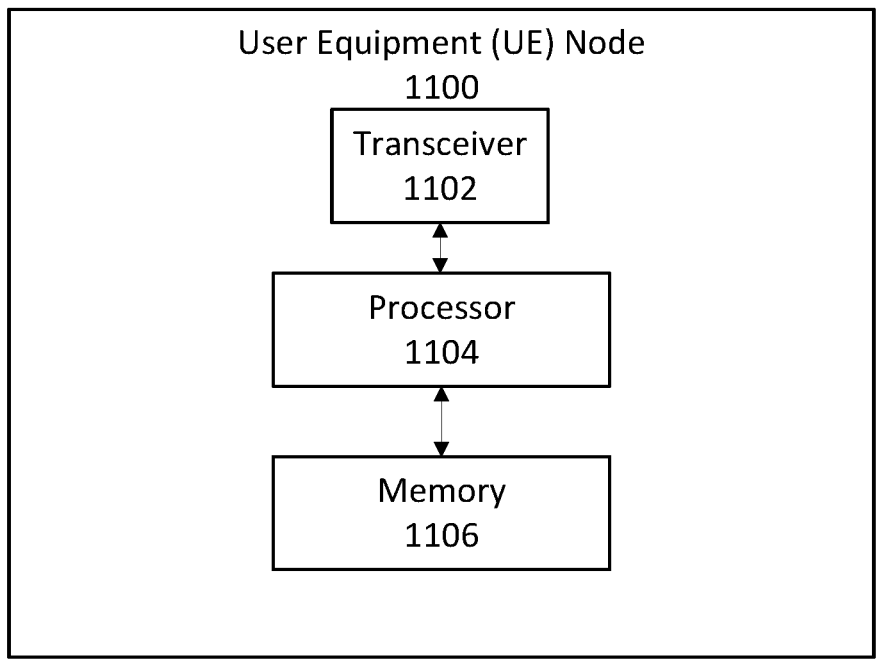
FIG. 11 is a block diagram of user equipment node in accordance with some embodiments of inventive concepts.

FIG. 11 depicts an example of a UE 1100 of a wireless communication network configured to provide wireless communication according to embodiments of inventive concepts. As shown, the UE 1100 may include a transceiver circuit 1102 (also referred to as a transceiver) including a transmitter and a receiver configured to provide uplink and downlink radio communications with wireless devices. The UE 1100 may also include a processor circuit 1104 (also referred to as a processor) coupled to the transceiver circuit 1102, and a memory circuit 1106 (also referred to as memory) coupled to the processor circuit 1104. The memory circuit 1106 may include computer readable program code that when executed by the processor circuit 1104 causes the processor circuit to perform operations according to embodiments disclosed herein. According to other embodiments, processor circuit 1104 may be defined to include memory so that a separate memory circuit is not required.

As discussed herein, operations of the UE 1100 may be performed by processor 1104 and/or transceiver 1102. For example, the processor 1104 may control transceiver 1102 to transmit uplink communications through transceiver 1102 over a radio interface to one or more network nodes and/or to receive downlink communications through transceiver 1102 from one or more network nodes over a radio interface. Moreover, modules may be stored in memory 1106, and these modules may provide instructions so that when instructions of a module are executed by processor 1104, processor 1104 performs respective operations (e.g., operations discussed herein with respect to example embodiments).

Accordingly, a UE 1100 according to some embodiments includes a processor circuit 1104, a transceiver 1102 coupled to the processor circuit 1104, and a memory 1106 coupled to the processor circuit, the memory including machine readable program instructions that, when executed by the processor circuit, cause the UE to perform operations.

Figure 12:
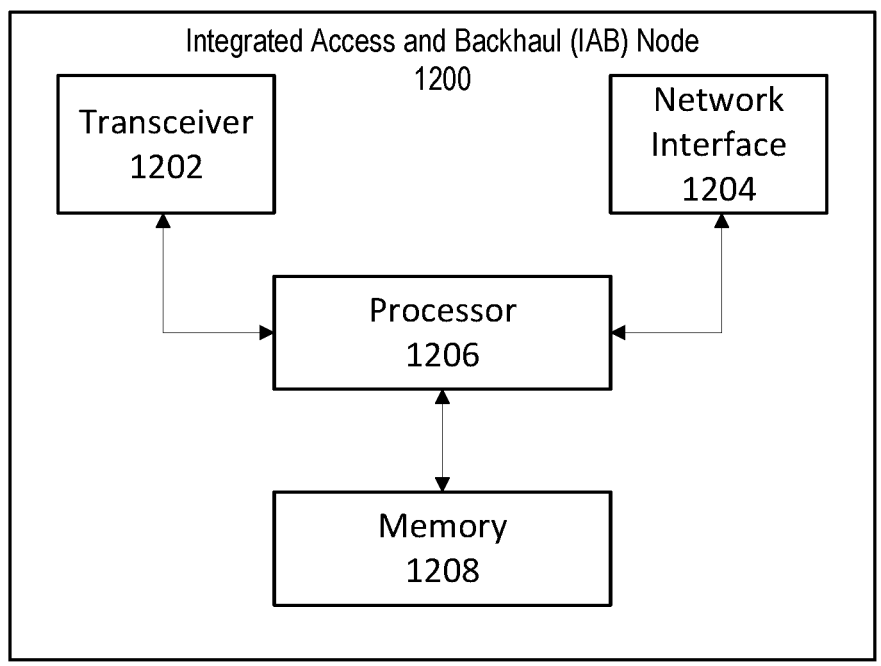
FIG. 12 is a block diagram of an IAB node in accordance with some embodiments of inventive concepts.

FIG. 12 is a block diagram of an IAB node according to some embodiments. Various embodiments provide an IAB node that includes a processor circuit 1206 a transceiver 1202 coupled to the processor circuit, and a memory 1208 coupled to the processor circuit. The memory 1208 includes machine-readable computer program instructions that, when executed by the processor circuit, cause the processor circuit to perform some of the operations depicted in FIGS. 13-16.

FIG. 12 depicts an example of an IAB node 1200 (also referred to as a base station, eNB, eNodeB, gNB, gNodeB, etc.) of a communication network configured to provide communication according to embodiments of inventive concepts. The IAB node 1200 may correspond to a central unit, a radio unit or a combination of a central unit and a radio unit in a RAN node. As shown, IAB node 1200 may include a transceiver circuit 1202 (also referred to as a transceiver) including a transmitter and a receiver configured to provide uplink and downlink radio communications with wireless devices. The IAB node 1200 may include a network interface circuit 204 (also referred to as a network interface) configured to provide communications with other nodes (e.g., with other IAB nodes, base stations and/or core network nodes) of the wireless communication network. The IAB node 1200 may also include a processor circuit 1206 (also referred to as a processor) coupled to the transceiver circuit 1202, and a memory circuit 1208 (also referred to as memory) coupled to the processor circuit 1206. The memory circuit 1208 may include computer readable program code that when executed by the processor circuit 1206 causes the processor circuit to perform operations according to embodiments disclosed herein. According to other embodiments, processor circuit 1206 may be defined to include memory so that a separate memory circuit is not required.

As discussed herein, operations of the IAB node 1200 may be performed by processor 1206, network interface 1204, and/or transceiver 1202. For example, processor 1206 may control transceiver 1202 to transmit downlink communications through transceiver 1202 over a radio interface to one or more UEs and/or to receive uplink communications through transceiver 1202 from one or more UEs over a radio interface. Similarly, processor 1206 may control network interface 1204 to transmit communications through network interface 1204 to one or more other IAB nodes and/or to receive communications through network interface from one or more other IAB nodes. Moreover, modules may be stored in memory 1208, and these modules may provide instructions so that when instructions of a module are executed by processor 1206, processor 1206 performs respective operations (e.g., operations discussed below with respect to example embodiments). Moreover, IAB nodes discussed herein may be implemented as virtual IAB nodes.

Accordingly, an IAB node 1200 according to some embodiments includes a processor circuit 1206, a transceiver 1202 coupled to the processor circuit, and a memory 1208 coupled to the processor circuit, the memory including machine readable program instructions that, when executed by the processor circuit, cause the IAB node 1200 to perform operations depicted in FIGS. 13-16.

IAB Node Integration

The setup and configuration (i.e. integration) for the IAB node is the first step in the operation of an IAB node. In 3GPP TR 38.874, three main phases were identified for the IAB node integration procedure. These three main phases are:

Establishing IP connectivity to the operator network
Setting up the IAB node as a DU
Providing service to end users (IAB node is operational)

Figure 1:
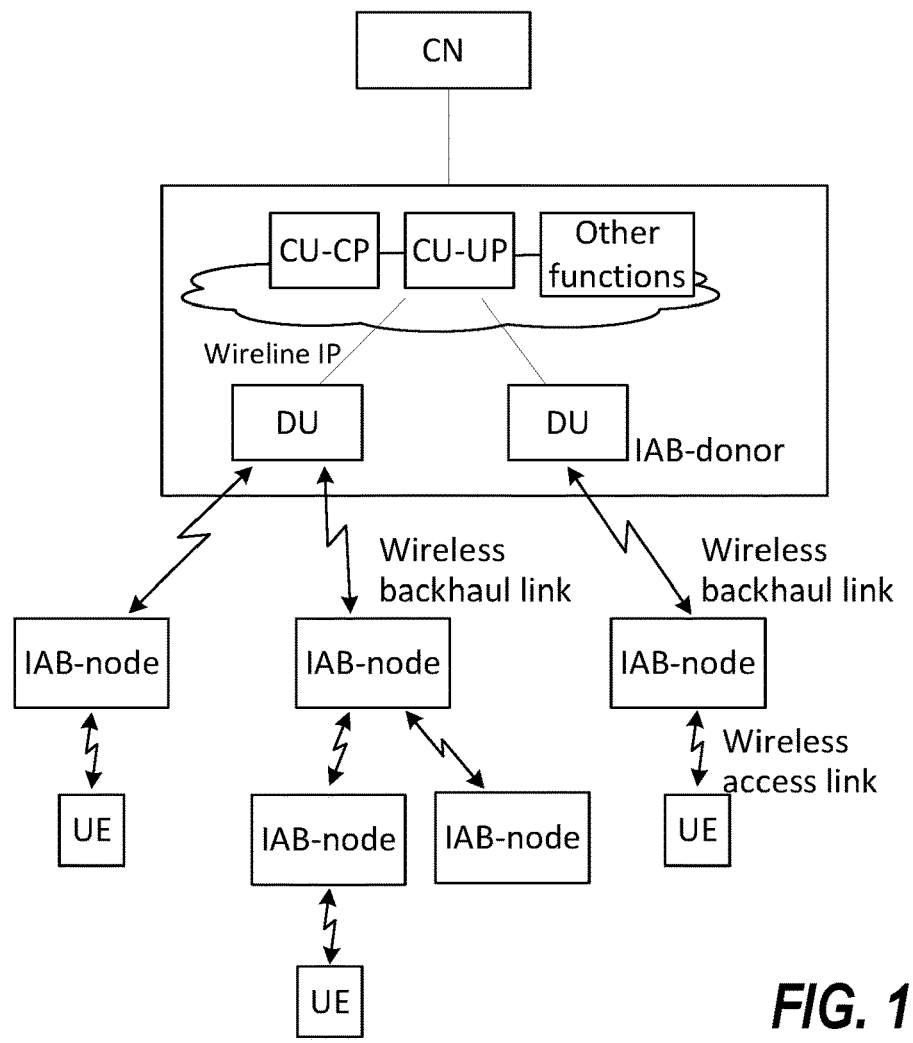
FIG. 1 illustrates a block diagram of IAB architectures.
Figure 3:
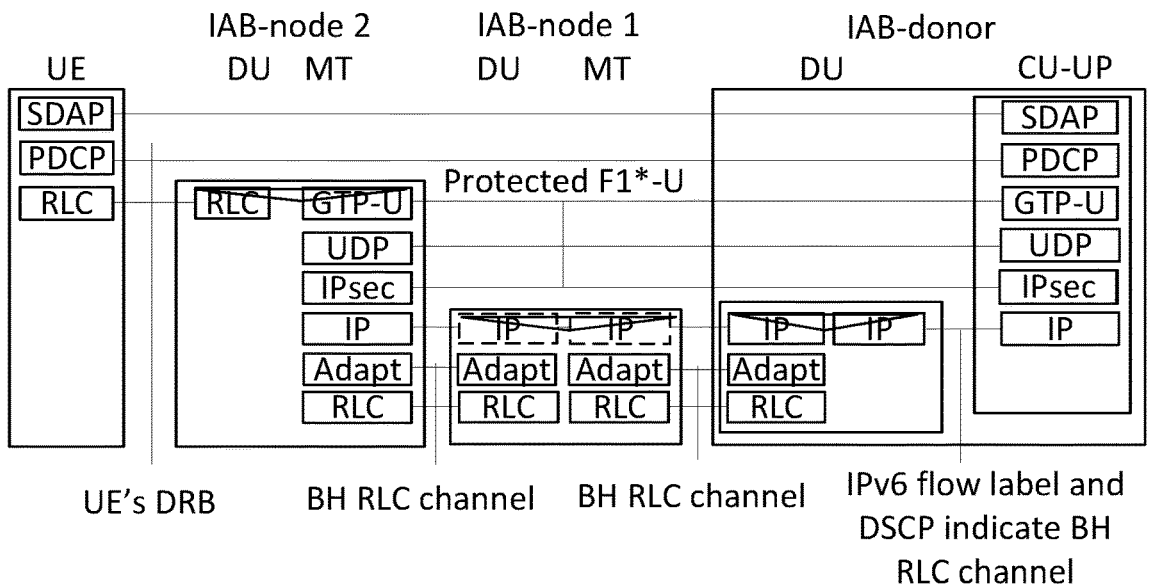
FIG. 3 is a block diagram illustrating a user plane, UP, protocol stack for the architecture illustrated in FIG. 2A.
Figure 2A:
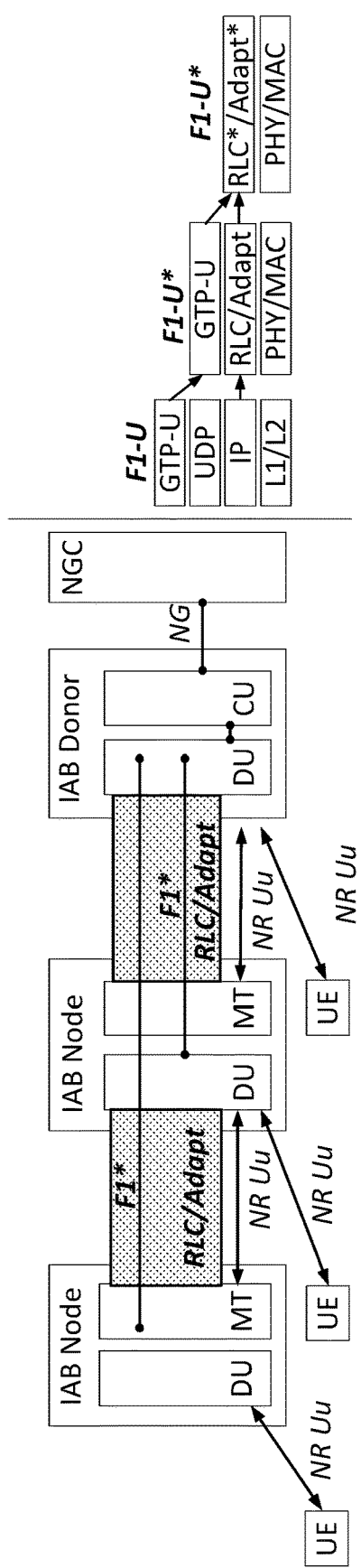
FIGS. 2A-2E are block diagrams illustrating potential architectures to implement IAB.
Figure 2B:
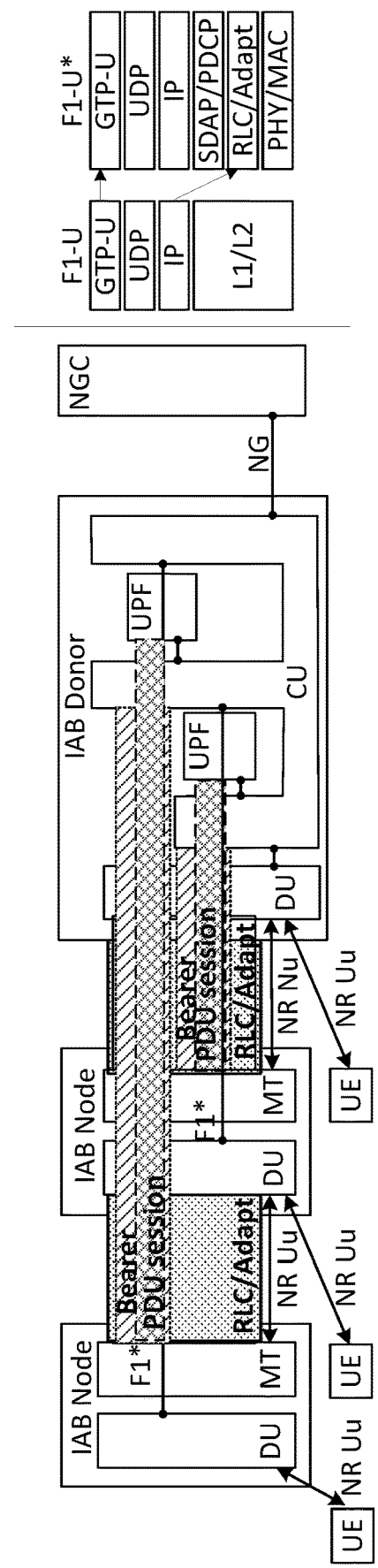
Figure 2C:
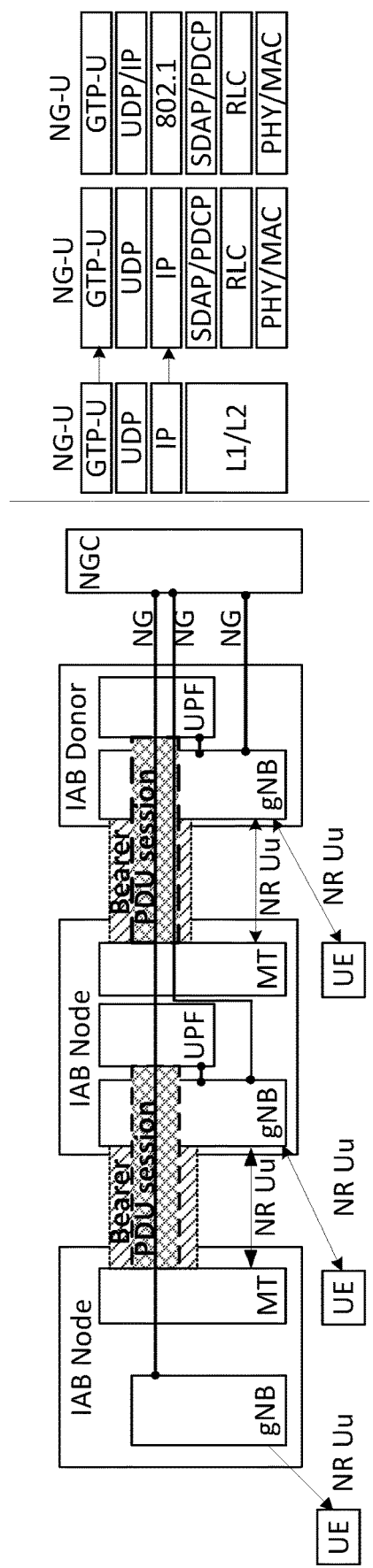
Figure 2D:
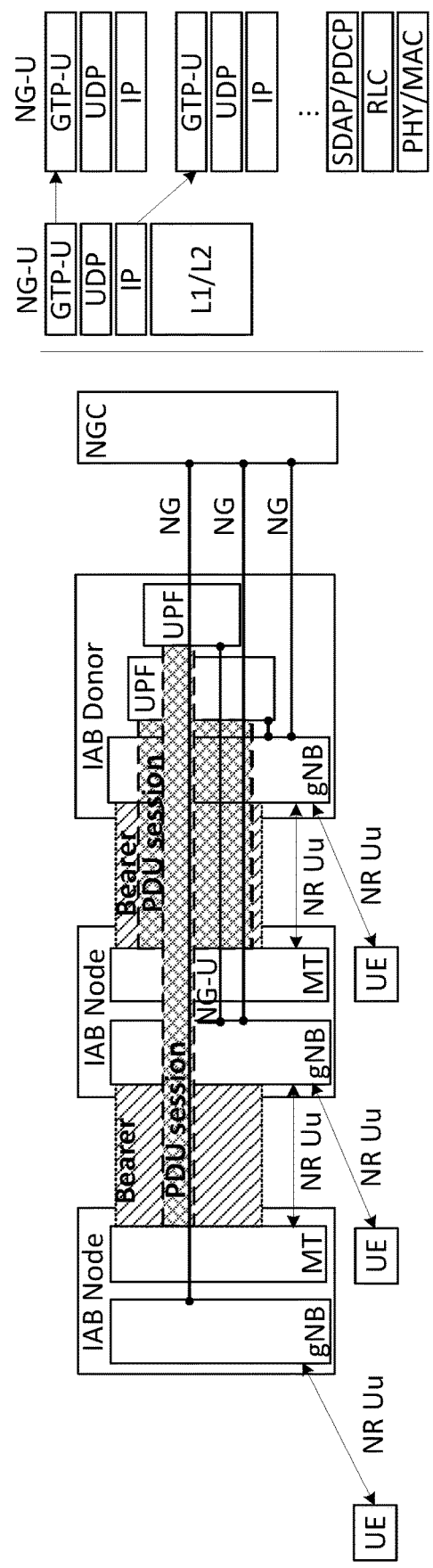
Figure 2E:
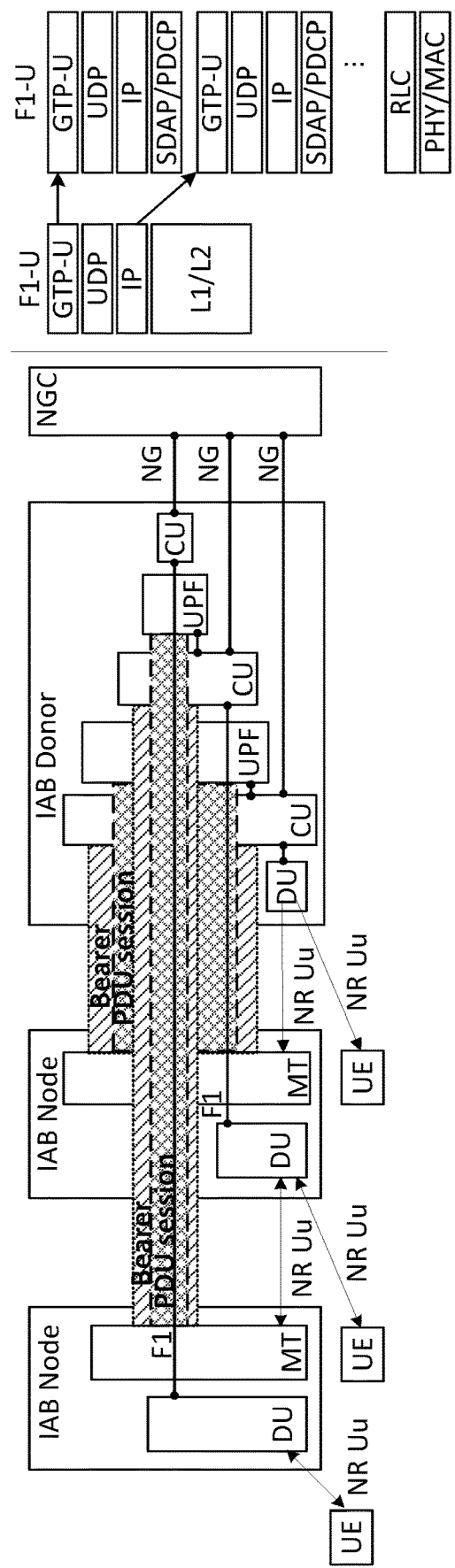
Figure 4A:
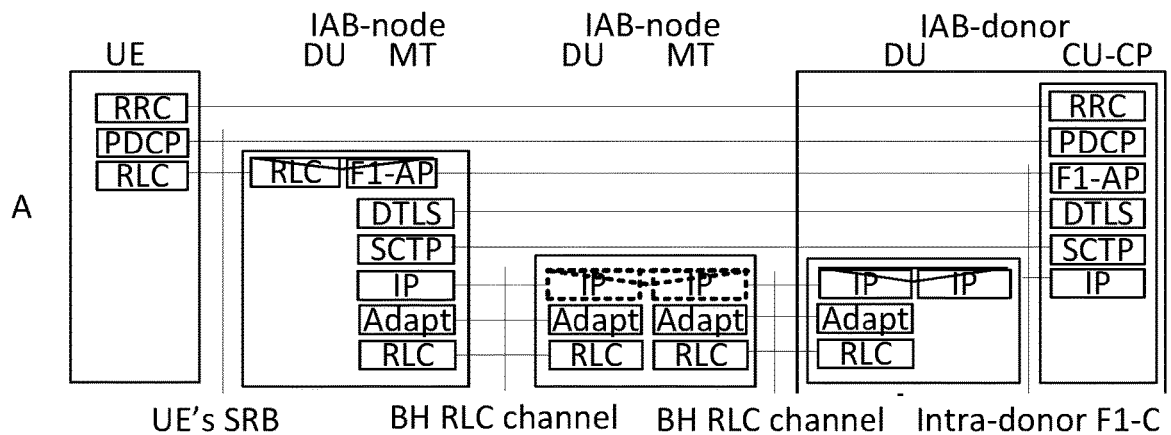
FIG. 4A is a block diagram of a control plane, CP, protocol stack for the architecture illustrated in FIG. 2A for a user equipment's radio resource control, RRC.
Figure 4B:
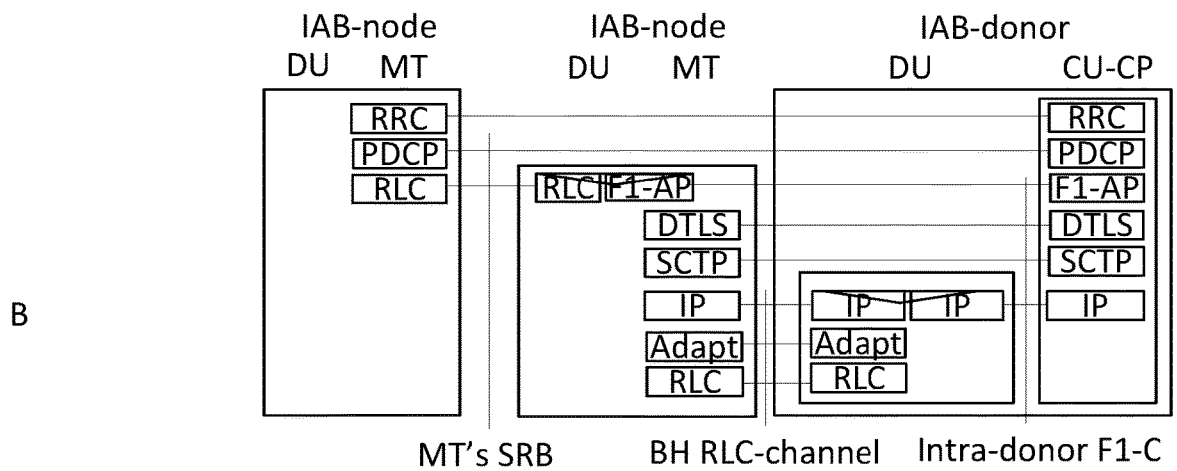
FIG. 4B is a block diagram of a CP protocol stack for the architecture illustrated in FIG. 2A for a mobile termination's RRC.
Figure 4C:
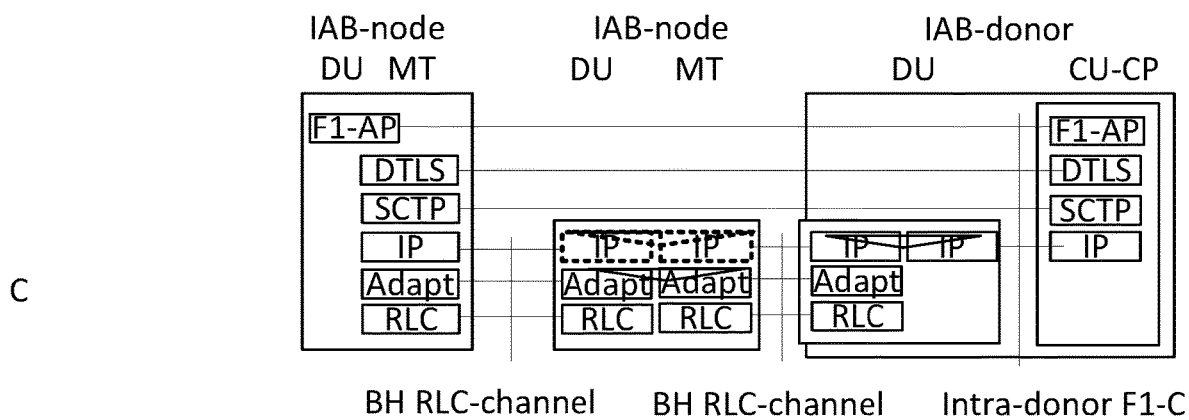
FIG. 4C is a block diagram of a control plane, CP, protocol stack for the architecture illustrated in FIG. 2A for an IAB distributed unit's, DU's, F1 application protocol, F1-AP.

The architecture illustrated in FIG. 2A can manage IP address assignment for IAB nodes internally in the radio access network, RAN, without core network, CN, involvement. The IAB node may first connect as an MT using RRC setup procedure. After RRC connection setup, the MT part of the IAB node may perform NAS level registration/authentication. No PDU session registration is required as shown in FIG. 1. After the NAS registration, UE context for the IAB node may be created in the RAN (without any PDU session resources). With this approach, there is no need to support any SMF/UPF functionality for the IAB nodes. NAS Rel-15 separates the NAS registration from the PDU session establishment, making it possible to perform registration without setting up PDU sessions and setting up a UE context in RAN without PDU session resources. Once the UE context for the IAB node has been setup in the RAN, the RAN may establish one or more backhaul bearers that can be used for IP address assignment to the IAB node.

There may be situations where the IAB node is not directly communicating with a Donor node but via other (already attached/connected) IAB nodes. The forwarding information in these other intermediate IAB nodes may be updated due to the setup of new IAB node.

After establishing connectivity to an operator's internal network, the DU (functionality of IAB node) and its cells/sectors may be configured by the operations, administration and maintenance, OAM, before the DU can send an F1 Setup Request message to its corresponding CU, i.e. IAB-CU. The architecture illustrated in FIG. 2A for IAB supports the full IP connectivity to the IAB node. This makes possible that the DU part of the IAB node may have direct IP connectivity to the OAM, instead of relying on the MT part to establish a special PDU session in the CN for OAM.

After configuring the DU part of the IAB node, the IAB node becomes operational as a DU and UEs will not be able to distinguish the IAB node from other gNBs. As such, the IAB node can start serving UEs like any other DU/gNB.

In an IAB system, a node may join a network through either the Donor node, DU, or any other IAB node DU that is already configured and operational in the network. The procedure will appear to be the same in both cases. Thus, the term gNB-DU may be used to denote the Access IAB node through which a new IAB is joining the network.

In an embodiment, the procedure for initial IAB node access may be based on the UE Initial Access signaling flow with modifications to fulfil the IAB node requirements. For activation of IAB node DU cells, the F1 Startup and cells activation procedure defined in TS 38.401 may be used with some modification.

Figure 5:
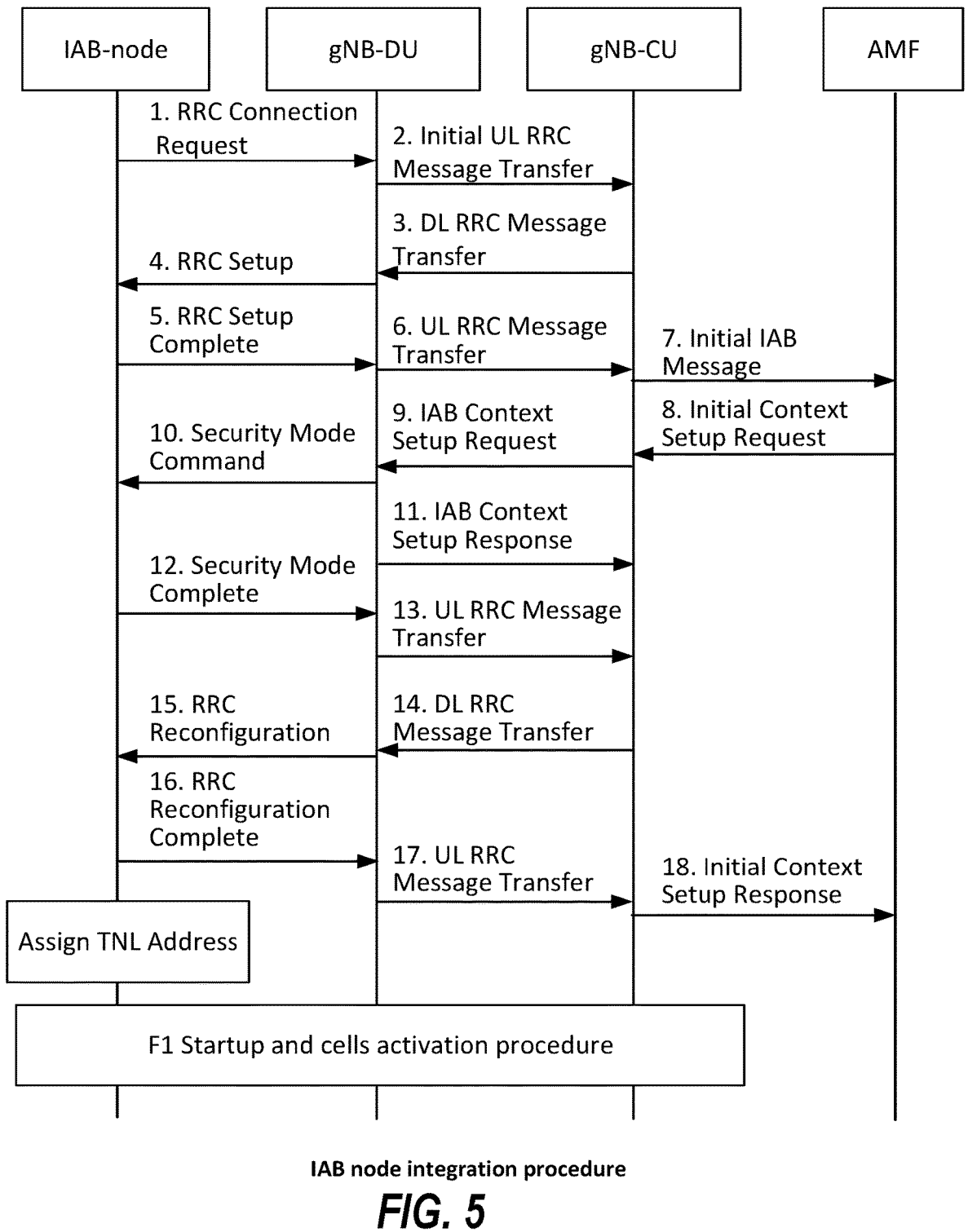
FIG. 5 is a signaling diagram illustrating an IAB node integration procedure in accordance with some embodiments of inventive concepts.

Based on the foregoing, the process for integrating the IAB node into the NG-RAN shall now be described. Turning to FIG. 5, in operation 1, the IAB node sends an RRCSetupRequest message to the gNB-DU.

In operation 2, the gNB-DU includes the RRC message and, when the IAB node is admitted, the corresponding lower layer configuration for the NR Uu interface in the INITIAL UL RRC TRANSFER message and transfers the message to the gNB-CU. The INITIAL UL RRC TRANSFER message includes the cell radio network temporary identifier, C-RNTI, allocated by the gNB-DU.

In operation 3, the gNB-CU allocates a gNB-CU UE F1AP ID for the IAB node and generates RRCSetup message towards the IAB node. The RRC message is encapsulated in the DL RRC MESSAGE TRANSFER message transmitted to the gNB-DU.

In operation 4, the gNB-DU sends the RRCSetup message to the IAB node.

In operation 5, the IAB node sends the RRC CONNECTION SETUP COMPLETE message to the gNB-DU. The single network slice selection assistance information, S-NSSAI, information element, IE, in the RRC CONNECTION SETUP COMPLETE message indicates the IAB node.

In operation 6, the gNB-DU encapsulates the RRC message in the UL RRC MESSAGE TRANSFER message and sends it to the gNB-CU.

In operation 7, the gNB-CU sends the INITIAL UE MESSAGE to the access and mobility function, AMF. The AMF may be a dedicated AMF serving only the IAB nodes.

At this point, the IAB node may perform registration (including authentication and key generation) without establishing a PDU session.

In operation 8, the AMF sends the INITIAL CONTEXT SETUP REQUEST message to the gNB-CU.

In operation 9, the gNB-CU sends the IAB CONTEXT SETUP REQUEST message to the gNB-DU to establish the IAB node context in the gNB-DU. In this message, the gNB-CU may also encapsulate the SecurityModeCommand message.

In operation 10, the gNB-DU sends the SecurityModeCommand message to the IAB node.

In operation 11, the gNB-DU sends the IAB CONTEXT SETUP RESPONSE message to the gNB-CU.

In operation 12, the IAB node responds to the SecurityModeCommand with the SecurityModeComplete message.

In operation 13, the gNB-DU encapsulates an RRC message in the UL RRC MESSAGE TRANSFER message and sends the UL RRC MESSAGE TRANSFER to the gNB-CU.

In operation 14, the gNB-CU generates the RRCReconfiguration message and encapsulates it in the DL RRC MESSAGE TRANSFER message. The RRCReconfiguration may include a configuration of one or more IAB backhaul bearers.

In operation 15, the gNB-DU sends the RRCReconfiguration message to the IAB node.

In operation 16, the IAB node sends RRCReconfigurationComplete message to the gNB-DU.

In operation 17, the gNB-DU encapsulates the RRC message in the UL RRC MESSAGE TRANSFER message and sends the UL RRC MESSAGE TRANSFER message to the gNB-CU.

In operation 18, the gNB-CU sends the INITIAL CONTEXT SETUP RESPONSE message to the AMF.

At this point, the IAB node has established one or more backhaul bearers that can be used for creating transport network layer, TNL, connectivity toward gNB-CU and obtaining a TNL address (e.g. IP address and port assignments). The IAB node may utilize the F1 Startup and Cells Activation procedures described in 3GPP TS 38.401 to activate its cells and become operational.

After activating its cells, the IAB node is operational and can serve the UEs. The UEs can connect to the IAB node via the UE Initial Access procedure described in 3GPP TS 38.401.

Backhaul-Link Failure

Figure 6:
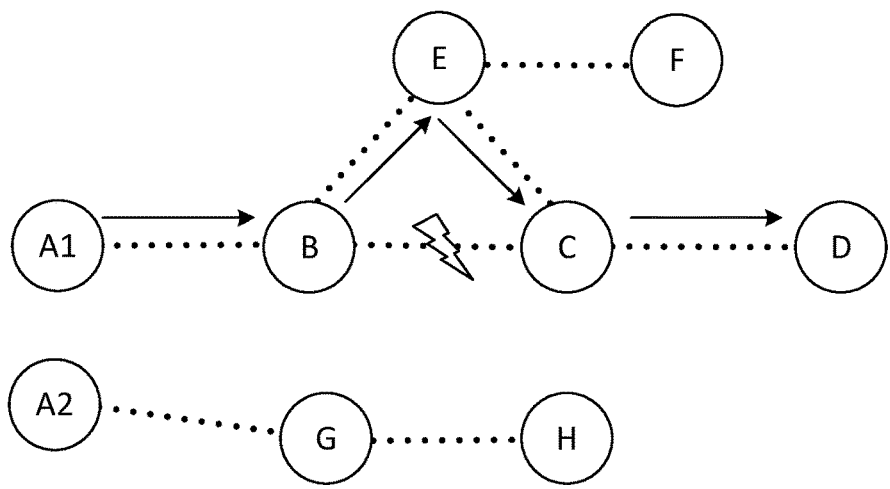
FIG. 6 is an illustration of an example of a first backhaul link failure scenario.
Figure 7:
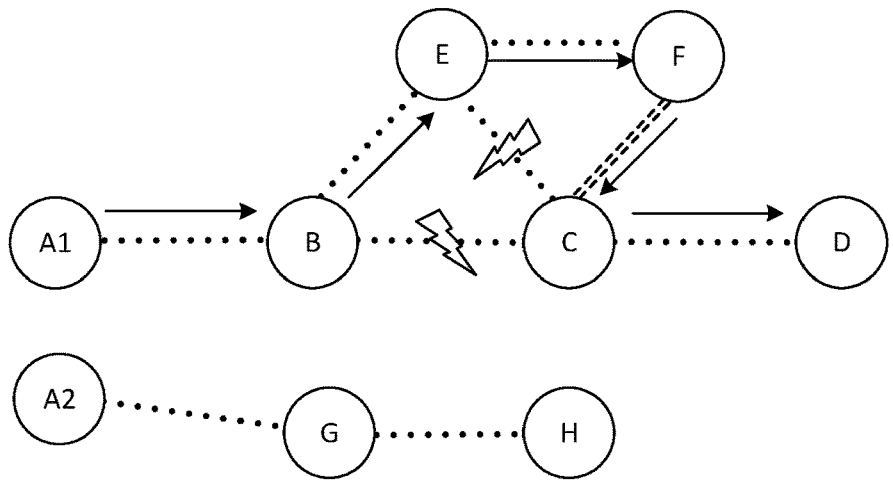
FIG. 7 is an illustration of an example of a second backhaul link failure scenario.
Figure 8:
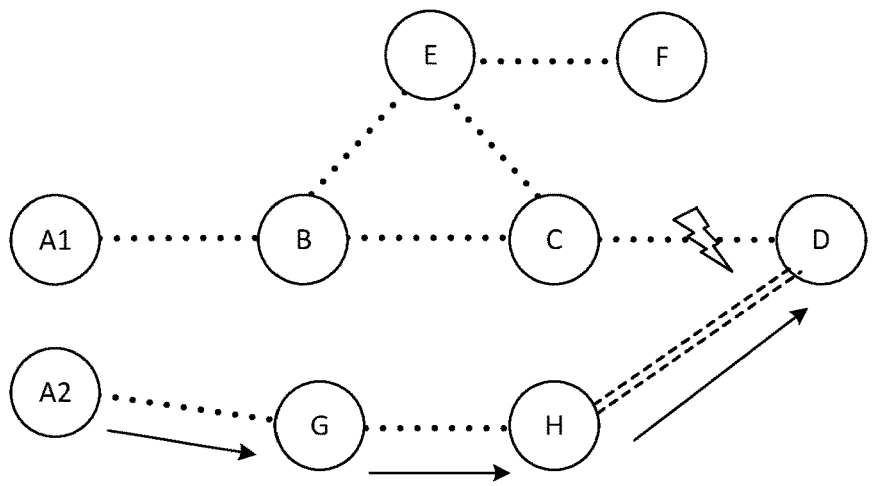
FIG. 8 is an illustration of an example of a third backhaul link failure scenario.

Backhaul-link failure may happen in IAB networks due to a variety of reasons. Turning now to FIGS. 6-8, three scenarios of backhaul-link failure are illustrated. Each of the three scenarios depicted are establishing a route between an IAB-donor node (IAB node A1 or A2) and IAB-node D after BH-link failure, where:

Nodes A1 and A2 are IAB-donor nodes; nodes B to H are IAB-nodes;

Each dashed line represents an established connection between two nodes;

The arrows represent the established route after BH-link failure.

The double dashed line represents a new established connection.

Turning to FIG. 6, the backhaul-link failure occurs between an upstream IAB-node (e.g., IAB-node C) and one of its parent IAB-nodes (e.g. IAB-node B), where the upstream IAB-node (i.e., IAB-node C) has an additional link established to another parent node (i.e., IAB-node E). The link that went from IAB-node B to IAB-node C is changed to be routed from IAB-node B to IAB-node E to IAB-node C.

Turning to FIG. 7, the backhaul-link failure occurs between an upstream IAB-node (e.g. IAB-node C) and all its parent IAB-nodes (e.g. IAB-nodes B and E). The upstream IAB-node (IAB-node C) has to reconnect to a new parent node (e.g. IAB-node F), and the connection between IAB-node F and IAB-node C is newly established.

Turning to FIG. 8, the backhaul-link failure occurs between IAB-node C and IAB-node D. IAB-node D has to reconnect to a new IAB-donor (e.g. IAB-donor A2) via a new route.

When the IAB-node observes RLF on the IAB-node's parent link, the IAB-node cannot provide further backhaul service to downstream IAB-nodes via the parent link. Additionally, child IAB-nodes cannot further serve their descendant IAB-nodes. An example of an RLF on a parent link is shown in FIG. 9, where IAB-node-5 observes RLF to its parent IAB-node-3 and subsequently cannot provide backhaul service to its child node, i.e., IAB-node-6.

The IAB-node observing RLF is aware about backhaul connectivity loss. However, the descendent IAB-nodes do not have explicit means to identify this upstream backhaul connectivity loss. In case the RLF can be recovered swiftly, as may be expected for the BH-RLF-recovery scenario illustrated in FIG. 6, there may be no need to explicitly inform the descendant IAB-nodes about the temporary BH connectivity loss. When the BH RLF cannot be recovered swiftly, it may be beneficial to release backhaul connectivity to descendant IAB-nodes so that the descendant IAB-nodes can seek to recover from the BH RLF. For this purpose, three options may be considered.

In a first option, the IAB-node DU may discontinue service. Consequently, the child nodes will determine BH RLF and perform procedures to recover. In a second option, the IAB-node DU alerts child IAB-nodes about the upstream RLF. Child IAB-nodes receiving this alert may forward the alert further downstream. Each IAB-node receiving such alert initiates BH-RLF recovery. In a third option, an IAB-node can regularly share information on, e.g., BH quality, to its child or parent IAB-nodes. In this manner, downstream or upstream RLF can be sensed without taking explicit actions.

In case a descendant IAB-node (such as IAB-node 6 in FIG. 9) can recover from such an upstream RLF by using one of the procedures described above, its DU can provide BH RLF-recovery for former ancestor nodes (such as IAB-node 5 in FIG. 9).

The recovery procedure for the backhaul failure scenarios illustrated in FIGS. 7 and 8 consists of identifying an alternate parent node and establishing/re-establishing control plane and user plane through the alternate parent node. However, identifying and attaching to an alternate node can take a significant amount of time and may not always be possible, e.g. due to lost connectivity with Donor CU or due to lack of alternative parent nodes (such as in millimeter-wave deployments). Thus, considering how the IAB network is reorganized when there is a backhaul failure in a way that minimizes interruption time of connection with the IAB-donor may need to be considered prior to a backhaul failure occurring.

For example, FIG. 10 illustrates a scenario of a backhaul failure on one of the links in an IAB network. In such a scenario, many IAB-nodes and UEs may be left without a connection to the IAB-donor and may need to find alternate parent nodes when a backhaul failure occurs. Downstream IAB-nodes (e.g. IAB-nodes 4, 6 in FIG. 10) and the IAB-donor may need to be informed of the backhaul failure. Furthermore, during situations where all the affected IAB-nodes simultaneously try to find alternate parent nodes, the resulting topology may be inefficient.

One approach to consider to reduce/prevent inefficient topologies when recovering from backhaul failures is to provide information to downstream IAB-nodes regarding backhaul failure including a list of nodes that cannot serve as parent nodes due to the backhaul failure. Another approach to consider is to prepare alternative backhaul links and routes in advance (i.e. before occurrence of an RLF).

Flow Control

In multi-hop backhauls, congestion may occur on intermediate IAB-nodes. On the uplink, an intermediate IAB-node acts as a gNB-DU to child IAB-nodes and can control the amount of uplink data from child IAB-nodes and UEs by adjusting the UL grants. For example, the current transmission/scheduling mechanisms control uplink data rate to an IAB-node. This transmission/scheduling mechanism allows mitigating congestion at the intermediate IAB-node. Additional control mechanism may be needed to handle uplink data congestion.

On the downlink, an IAB-node's link capacity to a child IAB-node or a UE may be smaller than the link capacity of a backhaul link from the parent IAB-node. The DU side of the parent IAB-node may not know the downlink buffer status of the IAB-node. As a result, the ingress data rate scheduled by the parent IAB-node's DU may be larger than the egress data rate the IAB-node's DU can schedule to its child IAB-nodes and UEs, which may result in downlink data congestion and packet discard at the intermediate IAB-node. Discarding of packets at intermediate IAB-nodes may have negative consequences (e.g. may lead to TCP slow start for impacted UE flows).

End-to-end flow control (e.g. flow control via F1-U or F1*-U) may help to address packet discard at the intermediate IAB-nodes due to the downlink data congestion problem by providing a downlink delivery status from the UE's access IAB-node DU in hop-by-hop ARQ to the IAB-donor CU. End-to-end ARQ similarly can address packet discard by intermediate IAB-nodes due to downlink data congestion. However, these mechanisms may be slow to react to local congestion problems in intermediate IAB-nodes as they do not provide information to pin point at which link/node the congestion is occurring. Thus, hop-by-hop flow control may also be required together with end-to-end congestion handling.

The congested IAB-node may provide feedback information to the parent IAB-node and/or the IAB-donor. Based on this feedback, the parent IAB-node or IAB-donor may perform flow control and alleviate downlink data congestion.

The flow control feedback may include the following information:

IAB-node buffer load;
IAB-node ID, where the congestion has occurred;
Potentially other information.

The granularity of the feedback information can be, e.g., per UE radio bearer, per RLC-channel, per backhaul link, etc.

Security

The IAB nodes may communicate in a secure way (e.g., ciphering, integrity, and replay protection) with the CU by relying on Network Domain Security defined for 3GPP network internal interfaces based on IPsec tunneling etc. Since IP layer is kept all the way to the IAB node it is possible to protect F1 signaling.

Ciphering means encryption of messages. Encryption makes it infeasible for unauthorized parties to decrypt and read the original message. Integrity protection means the sender adding security token or digital signature or message authentication code (MAC) to the message that the receiver can verify, which makes it infeasible for unauthorized parties to tamper the original message without the receiver detecting the tampering. Replay protection means that the receiver keeps track of previously received messages, which makes it infeasible for unauthorized parties to trick the receiver into accepting old messages sent by valid sender.

Problem and Potential Advantages

As discussed above, the CU-DU based architecture/protocol illustrated in FIG. 2A is being used. The F1-U/C messages to the IAB nodes that contain UP/CP data are protected via NDS (e.g. IPsec, DTLS). The PDCP is terminated E2E (end to end) between the CU and the UE (or the MT part of the IAB node) which is used to protect RRC signaling. This means that CP/UP data over the interface between the access IAB node (i.e. the IAB node serving the UE or the MT part of the child IAB node) will be encrypted (and also possibly integrity protected). Thus, the communication between the donor, the IAB nodes and UEs is completely secure.

However, as discussed above in the backhaul failure recovery, flow control, etc. descriptions, there may be a need to send a control message directly between two IAB nodes. There is no specified interface between the IAB nodes (i.e. DUs). Thus, it is likely that these messages are sent by including message information in an adaptation layer header or using other lower layer mechanisms, such as a MAC CE (MAC control element), which currently does not support any security mechanisms.

The problem with including message information via adaptation layer header or using other lower layer mechanism is that the messages are not secure, and an intruder/attacker can sabotage the system. For example, an intruder can inject a fake packet that indicates a backhaul link failure and force an IAB node to perform re-establishment to another node. An intruder may inject a flow control message to an IAB node, forcing the IAB node to stop or throttle its UL transmission (and corresponding SRs/BSR) to a parent node. These examples of attacks can cause severe disturbances to the end user service.

Since the IAB node aggregates the data for several UEs (and also other IAB nodes), ensuring that control signaling such as backhaul link failure indications and flow control are secure prevents an intruder from being able to cause the loss of connection or degradation of performance of a multitude of UEs.

In LTE/NR, the MAC CE is used to perform some control signaling between a UE and a gNB/DU. However, the control signaling is limited to operations such as power control and activating secondary cells in carrier aggregation. If an intruder was able to inject a fake message, only one UE will be affected (and a loss of connection will not occur as re-establishments are triggered by the UE detecting an RLF itself and other operations such as handover or release and redirect to another frequency are performed only via RRC, which is both encrypted and integrity protected.

The advantages provided by the inventive concepts described herein that provide mechanisms for IAB nodes to communicate directly with each other in a secure way prevents attacks against the IAB node. The mechanisms preventing the attacks reduce the severity of consequences to end users served by the IAB nodes. Utilizing established secure connections between the IAB nodes and the CU and/or OAM system simplifies the security setup e.g. by relying on already trusted connections.

The mechanisms described below for securing the direct communication between IAB nodes include:

The allocation and configuration of an IAB node (by one of parent IAB nodes or a donor IAB node) with a nonce (i.e. an arbitrary number that can be used just once in a cryptographic communication) or a list of nonces to be used for integrity protecting the communication with its parent node(s) or child node(s).

The nonce(s) is(are) are directly included as part of the signaling message to be sent between IAB nodes. The included nonce could be a specific indication (e.g. it could indicate link failure)

The nonce(s) is(are) are used to derive a MAC-I (secure message authentication code) and this MAC-I is included in the signaling message to be sent between IAB nodes. The MAC-I provides protection for the other content of the signaling message which could indicate things like link failure, flow control.

Replay protection may be achieved by the nonce being used only once. This results in the corresponding MAC-I being used only once.

The provision of keys/seeds and corresponding integrity protection algorithm or hashing algorithm to an IAB node (by one of parent IAB nodes or a donor IAB node) that may be used to derive a MAC-I that can be included in the signaling message to be sent between IAB nodes. The signaling messages may be associated with a sequence number, which is used to provide replay protection. Alternatively, or complementary, the IAB nodes could generate new keys, from the original key or seed, to be used for further communication between the IAB nodes, which also provide protection against replay attacks.

Reverse hash chain is another way on which security of communication between IAB nodes may be achieved as explained below.

Public/private keys or asymmetric cryptography is yet another way on which security of communication between IAB nodes could be achieved and is explained below.

To setup the secure connection between the IAB nodes, the secure signaling connections from each IAB node to the CU or to their operation and maintenance (OAM) system may be utilized. The CU or OAM can assist the IAB nodes to provide the nonce, keys (e.g. Public key, or symmetric keys) etc.

Embodiments of the Inventive Concepts

Figure 13:
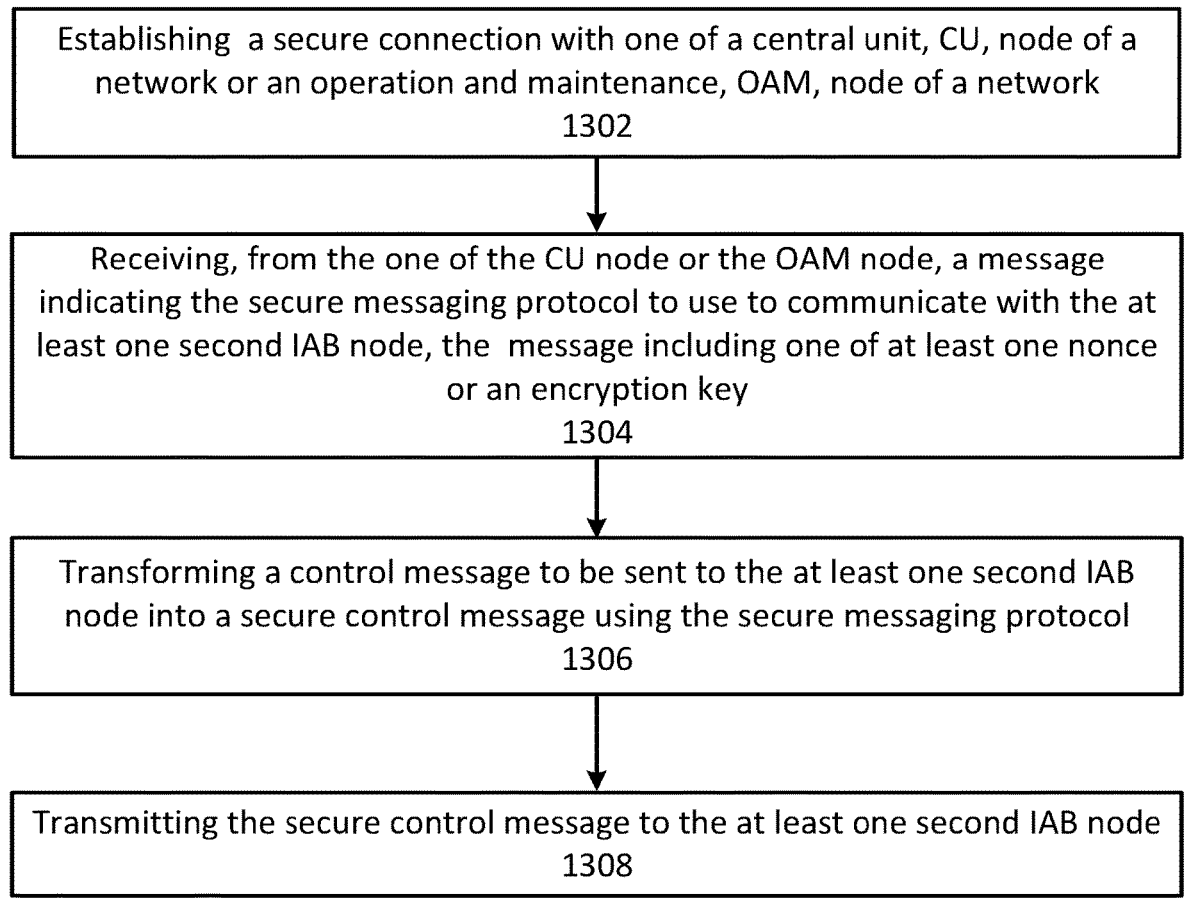
FIG. 13 is a flow chart illustrating an embodiment of configuring an IAB node in accordance with some embodiments of inventive concepts.

Turning to FIG. 13, the IAB node 1200 may be configured to set up secure communications for communications with a node of a networks such as between IAB nodes by a CU node of a network or an OAM node of a network. The CU node may be a donor node, a core network node, a parent IAB node, etc. In operation 1302, the IAB node 1200 establishes a secure connection with one of a central unit, CU, node of a network or an operation and maintenance, OAM, node of a network. In operation 1304, the IAB node 1200 receives a message indicating the secure messaging protocol to use to communicate with at least one second IAB node, the control message including one of at least one nonce or a key such as an encryption key. The IAB nodes receives the message from the one of the CU node or the OAM node. In operation 1306, the IAB node 1200 transforms a control message to be sent to the at least one second IAB node into a secure control message using the secure messaging protocol. In operation 1308, the IAB node 1200 transmits the secure control message to the at least one second IAB node. For example, consider the scenario illustrated in FIG. 10. Direct control message transmission/reception between IAB4 and IAB6 may be secured using the secure messaging protocol in accordance with the inventive concepts described in the following paragraphs.

Thus, the IAB node 1200 establishes a secure connection with a network node that may be a donor IAB node, a parent IAB node, a child IAB node, an OAM node, etc. The IAB node 1200 establishing the secure connection may be a parent IAB node, a child IAB node, or a donor IAB node. The IAB nodes may receive the message from the one of the CU node or the OAM node or a donor IAB node or a parent IAB node or a child IAB node.

Security Protection Based on Usage of Nonces

In one embodiment, during the process 1302 of an IAB node 1200 attaching to a network, the parent node of the IAB node 1200 and the IAB node 1200 that is attaching to the network are provided (in operation 1304) with one or more nonce values to be used for secure direct communication between the parent and child nodes. The nonce values may also be included when an IAB node 1200 re-connects to another node (e.g. topology adaptation due to backhaul link failure as discussed above, load balancing, etc.).

The IAB node 1200 can be provided with the nonce values via RRC message (e.g. RRCReconfiguration). The parent node can be provided with the nonce values via F1-AP (e.g. F1-AP UE context setup). In another embodiment, both nodes may receive the nonce values via F1-AP or RRC.

An IAB node 1200 may be a parent node to multiple IAB nodes. An IAB node 1200 may also have multiple parents. Both child and parent IAB nodes can have multiple sets of nonces (e.g., each nonce set is to be used only for a communication between a particular IAB node and a particular parent/child node of the IAB node).

For example, consider the scenario illustrated in FIG. 10. Assume IAB6 was set up via IAB4. During the initial configuration, IAB4 and IAB6 obtain a set of nonces needed for direct communication between each other. When IAB6 gets an additional parent (e.g., IAB7), IAB6 and IAB7 obtain a new set of nonces needed for direct communication between each other. When IAB6 becomes a parent to a new node that is attaching (e.g., IAB8), then IAB6 and IAB8 obtain a new set of nonces that IAB6 and IAB8 use to communicate with each other.

Figure 14:
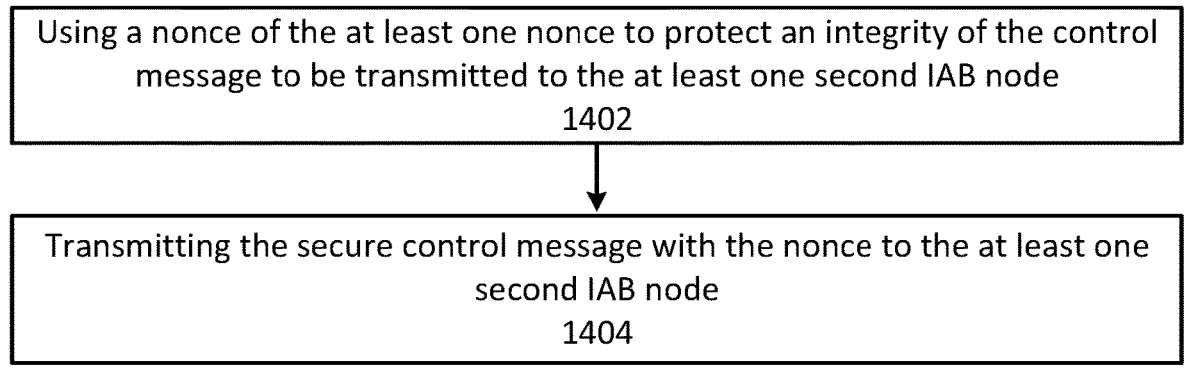
FIG. 14 is a flow chart illustrating an embodiment of securing control messages based on usage of nonces in accordance with some embodiments of inventive concepts.

Turning to FIG. 14, in operation 1402, the IAB node 1200 uses a nonce of at least one nonce to protect an integrity of a control message to be transmitted to the at least one second IAB node. The nonce values in the set of nonces may be associated with different messages, for example:

nonce1: for IAB flow control message (stop UL flow message to a child)

nonce2: for IAB flow control message (resume UL flow message to a child)

nonce3: for backhaul failure detection indication to a child nonce4: for backhaul failure recovery indication to a child nonce5: for failure to recovery backhaul link indication to a child, etc.

Since a nonce value can be used only once, multiple nonce values can be associated with a certain message. For example:

nonce1-nonce10: for an IAB flow control message (e.g., stop UL flow message to a child)

nonce11-nonce20: for an IAB flow control message (e.g., resume UL flow message to a child)

nonce21-nonce30: for backhaul failure detection indication to a child nonce31-nonce40: for backhaul failure recovery indication to a child nonce41: for failure to recovery backhaul link indication to a child, etc. (only one nonce is necessary since the child-parent relationship between the two nodes is over after this message exchange)

The nonce values may be used in different ways when transmitting the control messages with the nonce to the at least one second IAB node in operation 1404. Example of using the nonce values include:

The nonce value is included in the message header (e.g. adaptation layer header), and the receiver will check to see whether the corresponding nonce is configured. If the corresponding nonce is configured, the message passes the integrity verification test.

The nonce value implicitly determines the message type (e.g. the adaptation layer header will contain the nonce value but not the adaptation header field that identifies the message. Still other fields associated with the message, e.g. timers, optional fields, etc., can be included after the nonce).

The nonce value is used to calculate a MAC-I (e.g. used as an input in some pre-defined algorithm). This may be accomplished by using a key derivation function (KDF) that uses the algorithm and the nonce as an input to derive the MAC-I. The algorithm could also use other input values such as sequence number for replay protection.)

The main usage for the nonce is for integrity protection. The nonce many also be used for encryption. To avoid the need to encrypt/integrity verify every adaptation layer packet received, some of the fields in the adaptation layer such as the field that distinguishes if the packet is a data packet or a control packet, can be left visible while the rest of the message is encrypted. The receiver will then know when to do decrypting/integrity verification.

In one embodiment, the IAB nodes 1200, when being configured with the nonces, also receive an algorithm to be used to derive integrity protection MAC-I (or to encrypt the message, if that is applied). One algorithm may be configured for all derivation, or a separate algorithm may be configured for each control message (e.g. algorithm1 for backhaul failure indication, algorithm2 for flow control, etc.). If encryption is to be applied, the algorithm to be used for integrity verification may be the same algorithm or a different algorithm than the algorithm used for encryption. The IAB node may in advance, signal to the node configuring the algorithm, which security algorithm the IAB node supports (e.g. as part of a security capability information element).

An IAB node 120 and a corresponding peer of the IAB node 1200 (i.e. child or parent) may exhaust all the nonces that they have been configured with for a given operation (e.g. for flow control). In one embodiment, the IAB node 1200 may request a new set of nonces once that happens. One of the IAB nodes 1200 may request the new set of nonce. For example, in FIG. 10, if the nonces for flow control run out between IAB6 and IAB4, IAB4 can send a request to the donor CU (e.g. via F1-AP UE Context Modification Required message) the update, where in this case the UE context can be the UE context associated with the MT part of IAB6. Then the donor CU can send a message (e.g. F1-AP UE Context Modification Confirm) that includes the nonces to the IAB4 as well as the nonces to the IAB6 inside an RRC container that is part of the F1-AP message, The IAB4 forwards the message to IAB6 like any other RRC message. Alternatively, or complimentary to an IAB node requesting a new set of nonces, the donor CU could send new nonces in response to certain events, e.g. in the case the IAB node has experienced a link failure and recovers the connection, the donor CU could send a message to the IAB node with new nonces.

Security Protection Based on the Usage of Seeds/Keys

The approach of using nonces as described above reduces the complexity in providing a secure communication between two IAB nodes. However, the solution relies on the availability of enough nonces for all of the IAB nodes to use. When the nonces are exhausted by the IAB nodes, requests for new nonces must be made. Thus, the solution may not be scalable when there are a limited number of nonces that can be used.

Figure 15:
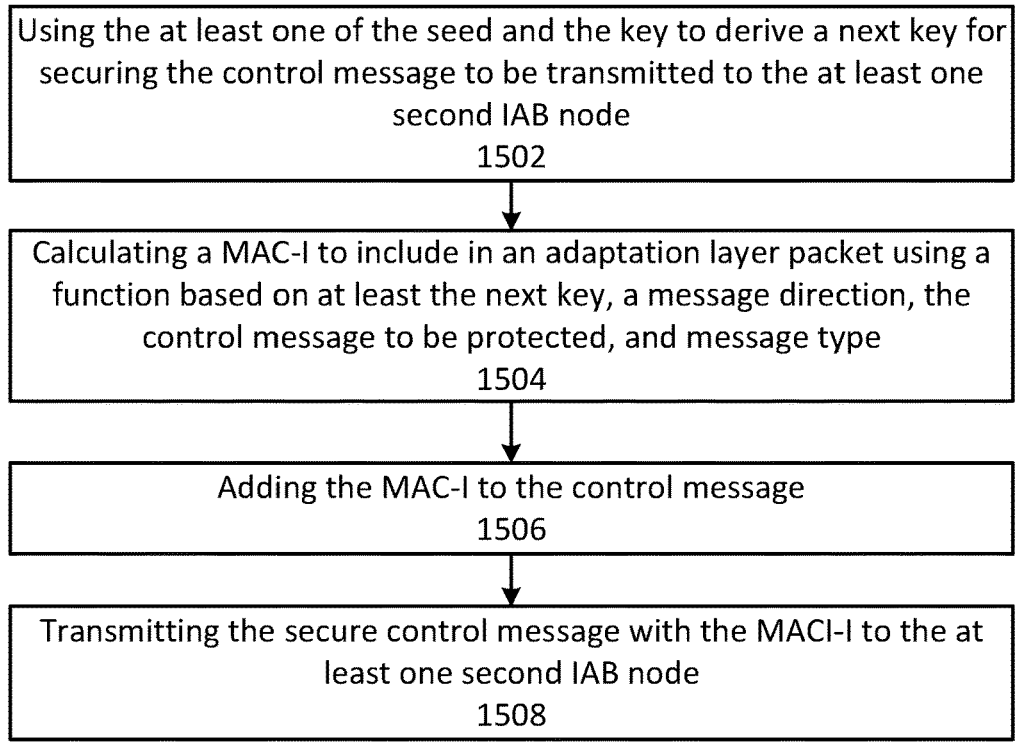
FIG. 15 is a flow chart illustrating an embodiment of securing control messages based on usage of seeds/keys in accordance with some embodiments of inventive concepts.

Turning now to FIG. 15, in a second embodiment, seeds/keys may be provided to the IAB nodes 1200 (e.g., operation 1304 of FIG. 13). In operation 1502, the IAB nodes 1200 can autonomously (based on some configured key derivation function, algorithms, etc.) derive the next key to be used for securing the control messages between IAB nodes 1200.

In one embodiment of the second embodiment, in operation 1502, the IAB node 1200 may use the at least one of the seed and the key for securing the control message to be transmitted to the at least one second IAB node.

In one embodiment of the second embodiment, the IAB nodes 1200 are provided with keys to use in operation 1304 of FIG. 13 (this can be one key for all types of messages, or a separate key for each type of message, for example, one key for flow control, one key for backhaul link failure related messages, etc.). Associated security algorithms (which can also be one for all, or a separate one for each type of messages) may also be received in operation 1304. In operation 1504, the IAB nodes 1200 calculate the MAC-I to be included in the adaptation layer packet using a function such as:

MAC-I=algorithm(key,direction,control message to be protected,message type)

where direction could be upstream or downstream, and the message type is a numeric code that is associated with each message type (e.g. backhaul link failure=0, flow control=1, etc.) Thus, calculating the message authentication code-integrity, MAC-I, to include in an adaptation layer packet may use a function based on at least the key, a message direction, the control message to be protected, and the message type.

In a further embodiment, when the at least one of the seed and the key is used to derive a next key for securing the control message to be transmitted to the at least one second IAB node, calculating the MAC-I to include in the adaptation layer packet using the function based on at least the key, the message direction, the control message to be protected, and the message type includes calculating the MAC-I to include in the adaptation layer packet using the function based on at least the next key, the message direction, the control message to be protected, and the message type.

In operation 1506, the MACI-I is added to the control message to transform the control message into a secure control message. In operation 1508, the secure control message with the MACI-I is transmitted to the second IAB node.

An additional approach is to include a count/sequence number associated with each message:

MAC-I=algorithm(key,direction,control message to be protected,message type,count)

One count value can be kept for all message types. For example, for the scenario illustrated in FIG. 10, after the link between IAB4 and IAB6 is established, both nodes can instantiate the count value associated with that link to 0. The MAC-I for the first control message will be derived using the count value of 0. After sending a control message, the count value is incremented by 1 (or some other pre-configured amount). The receiver of the message also does the same (i.e. increment it by 1 or some other pre-configured amount after the reception of every message).

Another approach is to have a count value that is different for each message type. For example, for the scenario illustrated in FIG. 10, after the link between IAB4 and IAB6 is established, both nodes can instantiate the count values associated with that link, for all possible message types, to 0. The MAC-I for the first control message of each message type will be derived using the count value of 0. After sending the control message, the count value associated with that message type (e.g. flow control) is incremented by 1 (or some other pre-configured amount), the receiver of a message also does the same (i.e. increment it by 1 or some other pre-configured amount after the reception of every message).

Security Protection Based on the Usage of Reverse Hash Chain

Figure 16:
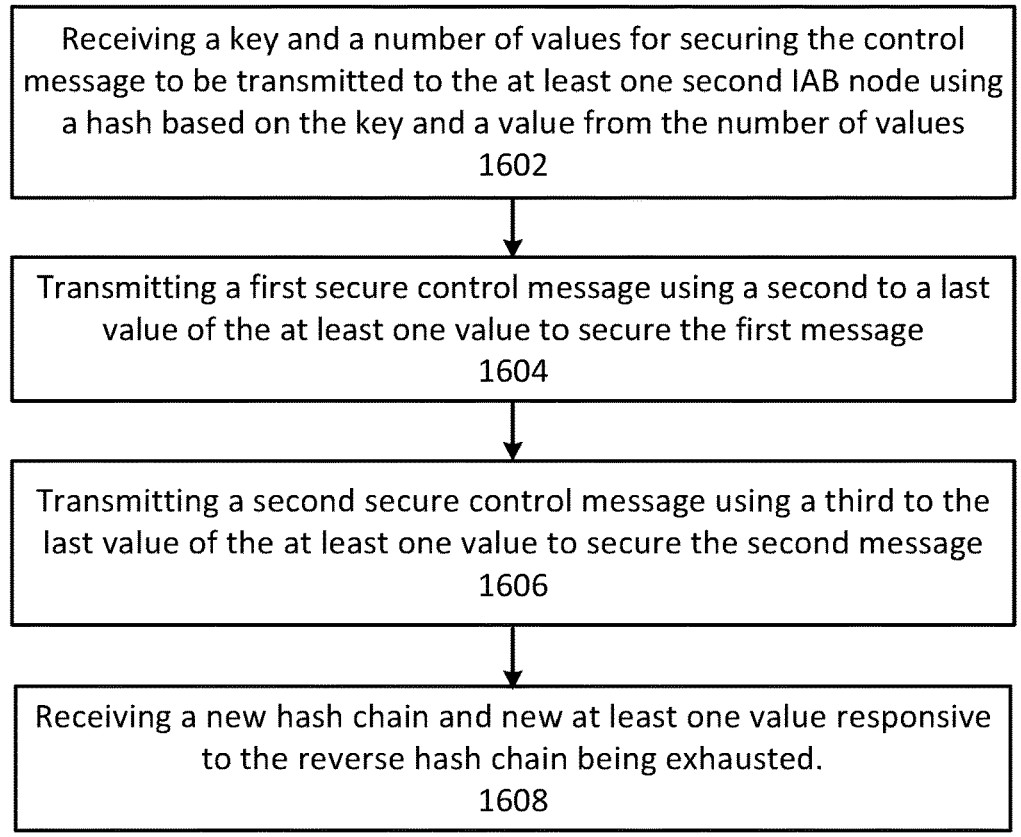
FIG. 16 is a flow chart illustrating an embodiment of securing control messages based on usage of a reverse hash chain in accordance with some embodiments of inventive concepts.

Turning now to FIG. 16, reverse hash chain is another approach with which security of communication between IAB nodes may be achieved. The term "hash" means a function which converts some original data into some other transformed data (of generally fixed size) so that it is infeasible to revert the transformed data into the original data. Hash functions may also have a key as one of the inputs so that a same original data will produce different transformed data when different keys are used. Reverse hash chain in this context would work as follows: Assume there are two IAB nodes Node_Sender and Node_Receiver. One of the two IAB nodes is the child and the other of the two IAB nodes is the parent. A key K could be used or skipped or used with constant value. A value N may be a static predefined value or a dynamically assigned value, or an implicitly determined value.

In operation 1602, the Node_Sender (e.g., IAB node 1200) receives the following values for securing the control message to be transmitted to the at least one second IAB node using a hash based on the key and a value from the number of values. For example, the Node_sender may receive:
a key K,
value_1=starting number like a random number,
value_2=hash (K, value_1),
value_3=hash (K, value_2), and so on until some number like value_N=hash (K, value_N−1)

Node_Receiver is provided with values—
    a key K,
    value_N.

In operation 1604, Node_Sender starts transmitting the secure control messages from the second last value, i.e., value_N−1. The Node_Receiver may verify that the message is valid by verifying that its local value_N is equal to hash (local K, received value_N−1). Now, Node_Receiver has local value_N−1. Node_Receiver cannot calculate value_N−1 from value_N. Other unauthorized entities do not know the local value_N at Node_Receiver or the value_N−1 that Node_Sender was supposed to send. This provides security to the messages.

After using value_N−1, in operation 1606, Node_Sender transmits other lower values, which may be called reverse hash chain. Node_Receiver also starts verifying received values and storing them. At some point, Node_Receiver has local value_3. Next, when Node_sender transmits value_2, Node_Receiver verifies that local value_3=hash (K, received value_2) and stores value_2 if verified.

In operation 1608, responsive to the reverse hash chain being exhausted, the IAB nodes 1200 are provided with a new hash chain and local values. New keys may also be provided.

Other inputs to the hash may be used. For example, in addition to K and some value, other additional inputs could be used like whole message, some other constant value, some other dynamic values, etc.

Security Protection Based on the Usage of Public Keys

Public/private keys or asymmetric cryptography is another approach to provide security of communication between IAB nodes 1200. The IAB nodes 1200 could be provided (by parent or donor or core node) with public/private keys. The same nomenclatures of Node_Sender and Node_Receiver shall be used to describe this approach of providing secure communications for the two IAB nodes 1200.

- Node_Sender has a private key with which Node-Sender can calculate a digital signature of the message is sent to Node_Receiver. There may be several inputs to the calculation of the digital signature. For example, timestamps, sequence numbers, messages, other contextual values, etc. may be used in the calculation.
- Node_Receiver has Node_Sender's public key with which Node_Receiver can validate that the received digital signature was produced by the Node_Sender.
- Certificates may also be used.
- The public/private keys that already exists, e.g., used in O&A interface security or F1 security, could be used to provide the security protection.
- Existing keys derived using public/private keys, e.g., used in O&A interface security or F1 security, may be reused, e.g., in a transformed key from existing key.

The embodiments described above may ensure that direct control message transmission/reception between IAB nodes is secure and cannot be tampered with by using semi-static mechanisms such as the pre-configured nonces used to integrity protect messages and dynamic mechanisms such as the sequential generation of keys used to protect the messages based on key generation algorithms/principles.

Abbreviations

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 3GPP | 3rd Generation Partnership Project |
| IAB | Integrated Access Backhaul |
| CN | Core Network |
| CU | Central Unit |
| DU | Distributed Unit |
| CP | Control Plane |
| UP | User Plane |
| UE | User Equipment |
| PDCP | Packet Data Convergence Protocol |
| RLC | Radio Link Control |
| MAC | Medium Access Control |
| MAC-I | Message Authentication Code - Integrity |
| SDU | Service Data Unit |
| PDU | Protocol Data Unit |
| SR | Scheduling Request |
| BSR | Buffer Status Report |
| UL | Uplink |
| DL | Downlink |
| ACK | Acknowledgement |
| NACK | Negative ACK |
| RRC | Radio Resource Control |
| SIB | System Information Block |

References:
[1] 3GPP TS 38.401 v15.4.0 - $3^{rd}$ Generation Partnership Project; Technical Specification Group Radio Access Network; NG-RAN; Architecture description (Release 15)
[2] 3GPP TR 38.874 v16.0.0 - 3rd Generation Partnership Project; Technical Specification Group Radio Access Network; NR; Study on Integrated Access and Backhaul; (Release 16)

Listing of Example Embodiments

Example Embodiments are discussed below. Reference numbers/letters are provided in parenthesis by way of example/illustration without limiting example embodiments to particular elements indicated by reference numbers/letters.

1. A method by a first integrated access and backhaul, IAB, node for securely communicating with at least one second IAB node, the method comprising:
    establishing (1302) a secure connection with one of a central unit, CU, node of a network or an operation and maintenance, OAM, node of a network;
    receiving (1304), from the one of the CU node or the OAM node, a message indicating the secure messaging protocol to use to communicate with the at least one second IAB node, the message including one of at least one nonce or an encryption key;
    transforming (1306) a control message to be sent to the at least one second IAB node into a secure control message using the secure messaging protocol; and
    transmitting (1308) the secure control message to the at least one second IAB node.

2. The method of Embodiment 1, wherein the CU node is one of a parent IAB node or a donor IAB node.

3. The method of Embodiment 1, wherein the secure messaging protocol comprises a protocol using at least one nonce and wherein using the secure messaging protocol to transmit the control message to the at least one second IAB node comprises:
    using (1402) a nonce of the at least one nonce to protect an integrity of the control message being transmitted to the at least one second IAB node; and
    transmitting (1404) the secure control message with the nonce to the at least one second IAB node.

4. The method of Embodiment 3 wherein using the nonce to protect the integrity of the control message comprises:
including a value of the nonce in a message header of the control message.
5. The method of Embodiment 3 wherein using the nonce to protect the integrity of the control message comprises:
calculating a MAC-I using a value of the nonce; and
using the MAC-I in a pre-defined algorithm.
6. The method of Embodiment 5 further comprising receiving the pre-defined algorithm.
7. The method of any of Embodiments 2-6 wherein the at least one nonce comprises a set of nonces and each of a plurality of the set of nonces is associated with a different message.
8. The method of Embodiment 7 wherein each of the plurality of the set of nonces is associated with one of: a nonce for an IAB flow control stop upload, UL, flow message to a child IAB node, a nonce for an IAB flow control resume UL flow message to the child IAB node, a nonce for a backhaul failure detection indication to the child IAB node, a nonce for a backhaul failure recovery indication to the child IAB node, and a nonce for a failure to recovery backhaul link indication to the child IAB node.
9. The method of Embodiment 1 wherein the secure messaging protocol comprises a protocol using at least one of a seed and a key and wherein using the secure messaging protocol to transmit the control message to the at least one second IAB node comprises:
using (1502) the at least one of the seed and the key to derive a next key for securing the control message to be transmitted to the at least one second IAB node;
calculating (1504) a MAC-I to include in an adaptation layer packet using a function based on the next key, a message direction, the control message to be protected, and message type;
adding (1506) the MAC-I to the control message; and
transmitting (1508) the secure control message with the MACI-I to the at least one second IAB node.
10. The method of Embodiment 9 further comprising:
using a sequence number associated with the control message; and
wherein calculating the MAC-I to include in an adaptation layer packet uses a function based on the next key, the message direction, the control message to be protected, the message type, and the sequence number.
11. The method of Embodiment 10 wherein each message type has a sequence number.
12. The method of Embodiment 1 wherein the secure messaging protocol comprises a protocol using a reverse has chain.
13. The method of Embodiment 1 wherein the secure messaging protocol comprises a protocol using public/private key pairs.
14. An integrated access and backhaul, IAB, node (1200) for securely communicating with at least one second IAB node and adapted to perform operations according to Embodiment 1.
15. The IAB node (1200) of Embodiment 14, wherein the IAB node (1200) is configured to perform the operations of Embodiments 2-13.
16. An integrated access and backhaul, IAB, node (1200) for securely communicating with at least one second IAB node, the IAB node (1200) comprising:
a processor (1206); and
a memory (1208) storing instructions that, when executed by the processor (1206), cause the IAB node (1200) to perform operations comprising:
establishing (1302) a secure connection with one of a central unit, CU, node of a network or an operation and maintenance, OAM, node of a network;
receiving (1304), from the one of the CU node or the OAM node, a message indicating the secure messaging protocol to use to communicate with the at least one second IAB node, the message including one of at least one nonce or an encryption key;
transforming (1306) a control message to be transmitted to the at least one second IAB node into a secure control message using the secure messaging protocol; and
transmitting (1308) the secure control message to the at least one second IAB node.
17. The IAB node of Embodiment 16 wherein the CU node is one of a parent IAB node or a donor IAB node.
18. The IAB node of Embodiment 16, wherein the secure messaging protocol comprises a protocol using at least one nonce and wherein to use the secure messaging protocol to transmit the control message to the at least one second IAB node, the instructions comprise further instructions that, when executed by the processor, cause the IAB node to perform operations comprising:
using (1402) a nonce of the at least one nonce to protect an integrity of the control message being transmitted to the at least one second IAB node; and
transmitting (1404) the secure control message with the nonce to the at least one second IAB node.
19. The IAB node of Embodiment 18 wherein to use the at least one nonce to protect the integrity of the control message, the instructions comprise further instructions that, when executed by the processor, cause the IAB node to perform operations comprising:
including a value of the at least one nonce in a message header of the control message.
20. The IAB node of Embodiment 18 wherein to use the nonce of the at least one nonce to protect the integrity of the control message, the instructions comprise further instructions that, when executed by the processor, cause the IAB node to perform operations comprising:
calculating a MAC-I using a value of the at least one nonce; and
using the MAC-I in a pre-defined algorithm.
21. The IAB node of Embodiment 20 wherein the instructions comprise further instructions that, when executed by the processor, cause the IAB node to perform further operations comprising:
receiving the pre-defined algorithm.
22. The IAB node of any of Embodiments 18-21 wherein the at least one nonce comprises a set of nonces and each of a plurality of the set of nonces is associated with a different message.
23. The IAB node of Embodiment 22 wherein each of the plurality of the set of nonces is associated with one of: a nonce for an IAB flow control stop upload, UL, flow message to a child IAB node, a nonce for an IAB flow control resume UL flow message to the child IAB node, a nonce for a backhaul failure detection indication to the child IAB node, a nonce for a backhaul failure recovery indication to the child IAB node, and a nonce for a failure to recovery backhaul link indication to the child IAB node.
24. The IAB node of Embodiment 16 wherein the secure messaging protocol comprises a protocol using at least one of a seed and a key and wherein to use the secure messaging protocol to transmit the control message to the at least one second IAB node, the instructions comprise further instructions that, when executed by the processor, cause the IAB node to perform operations comprising:
using (1502) the at least one of the seed and the key to derive a next key for securing a message being transmitted to the at least one second IAB node;
calculating (1504) a MAC-I to include in an adaptation layer packet using a function based on the next key, a message direction, the control message to be protected, and message type;
adding (1506) the MAC-I in the control message; and
transmitting (1508) the secure control message with the MACI-I to the at least one second IAB node.

25. The IAB node of Embodiment 24 wherein the instructions comprise further instructions that, when executed by the processor, cause the IAB node to perform further operations comprising:
using a sequence number associated with the control message; and
wherein calculating the MAC-I to include in an adaptation layer packet uses a function based on the next key, the message direction, the control message to be protected, the message type, and the sequence number.

26. The IAB node of Embodiment 25 wherein each message type has a sequence number.

27. The IAB node of Embodiment 16 wherein the secure messaging protocol comprises a protocol using a reverse has chain.

28. The IAB node of Embodiment 16 wherein the secure messaging protocol comprises a protocol using public/private key pairs.

Additional Explanation

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 17:
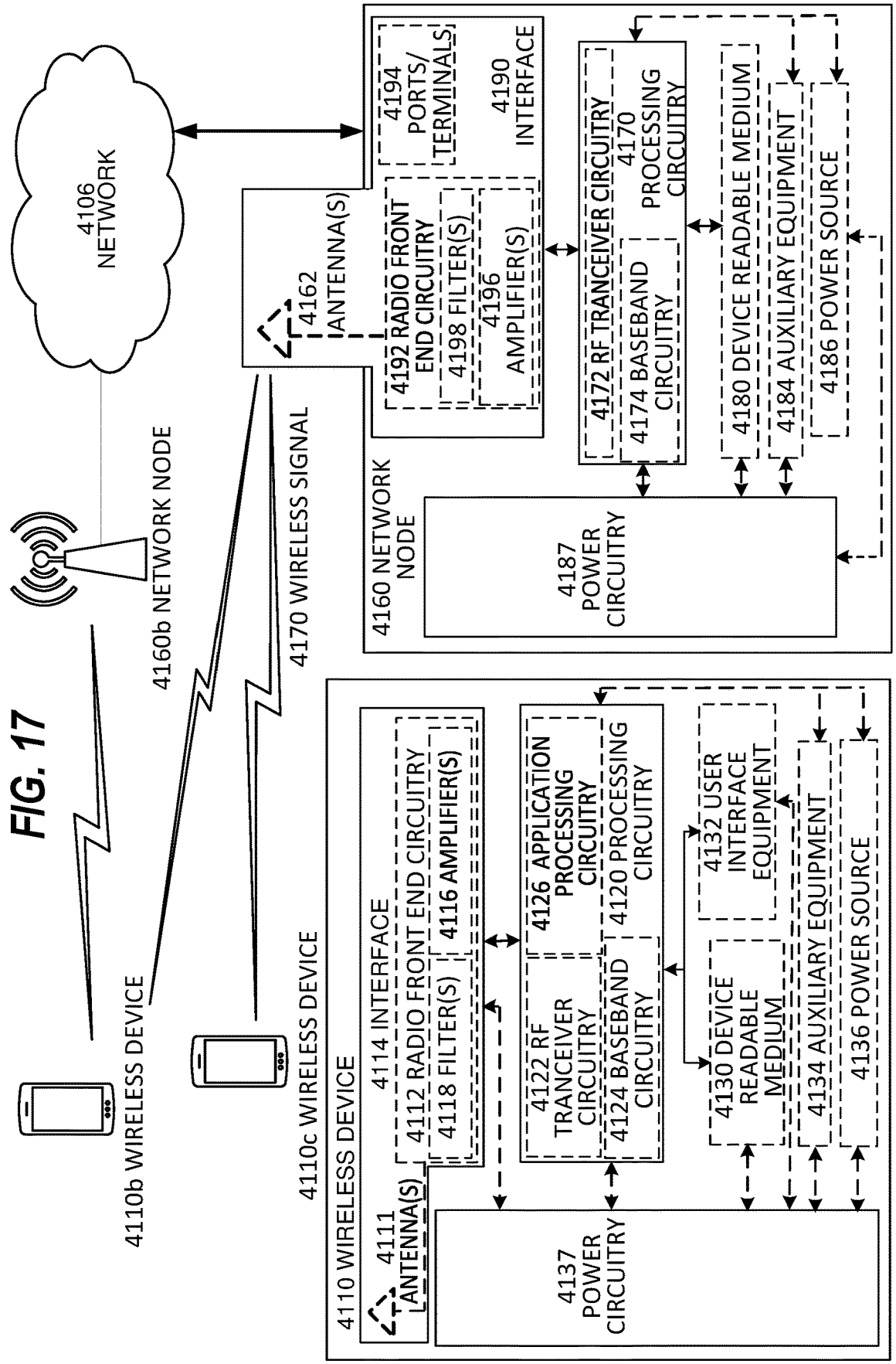
FIG. 17 is a block diagram of a wireless network in accordance with some embodiments.

FIG. 17: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 17 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 18:
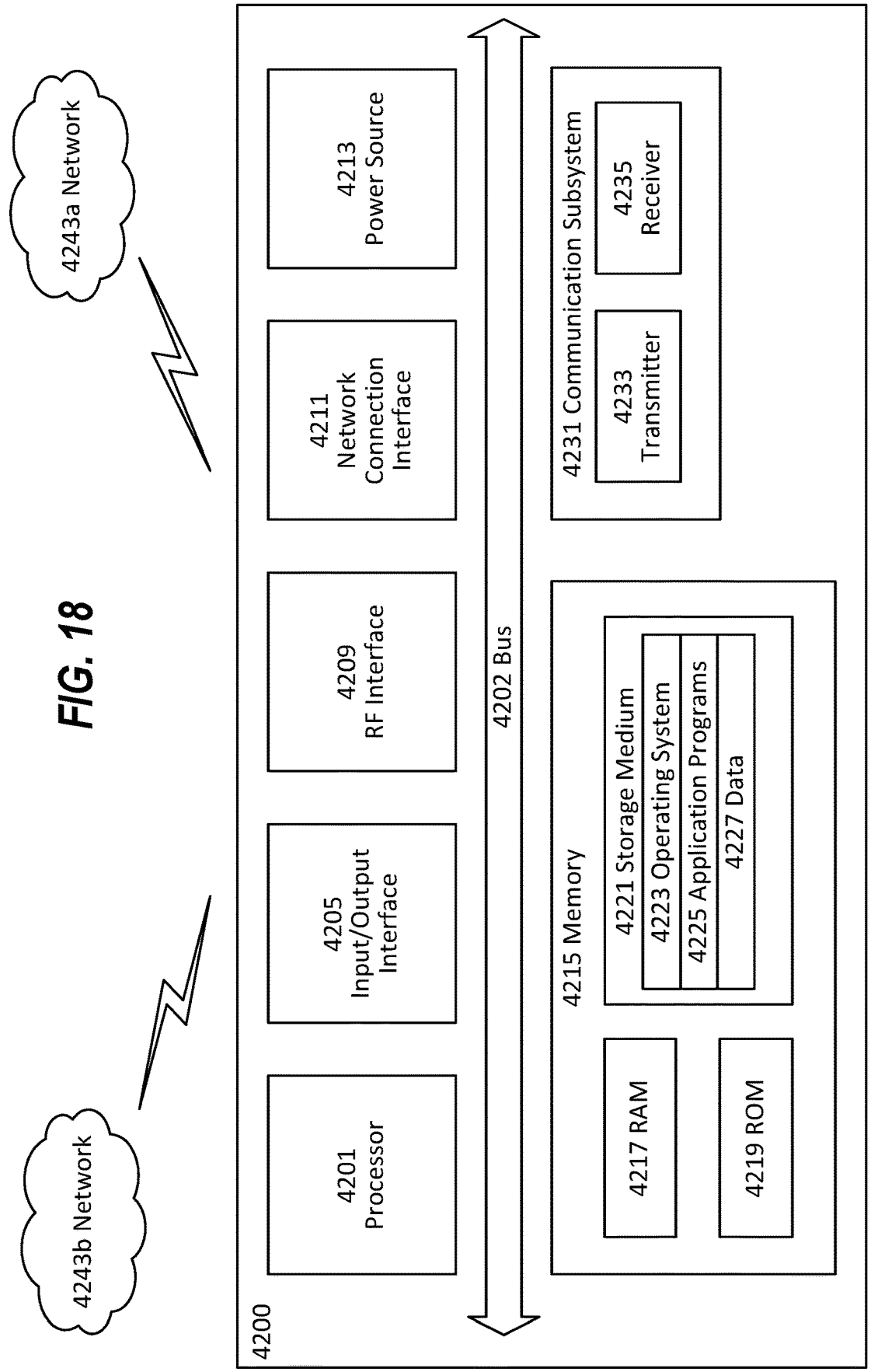
FIG. 18 is a block diagram of a user equipment in accordance with some embodiments

FIG. 18: User Equipment in accordance with some embodiments

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 18, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 19:
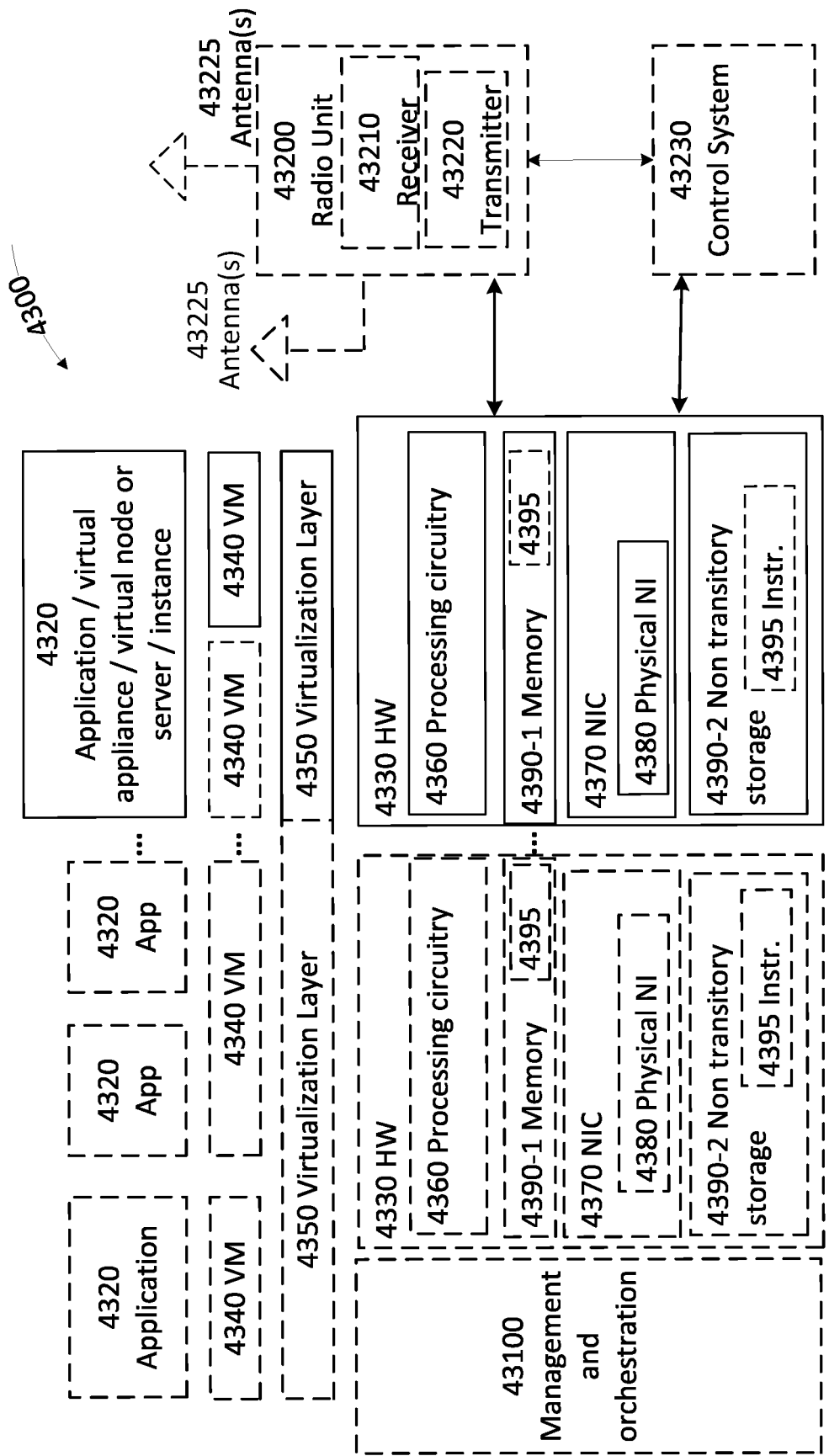
FIG. 19 is a block diagram of a virtualization environment in accordance with some embodiments.

FIG. 19: Virtualization environment in accordance with some embodiments

FIG. 19 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340, comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 19, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 19.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 20:
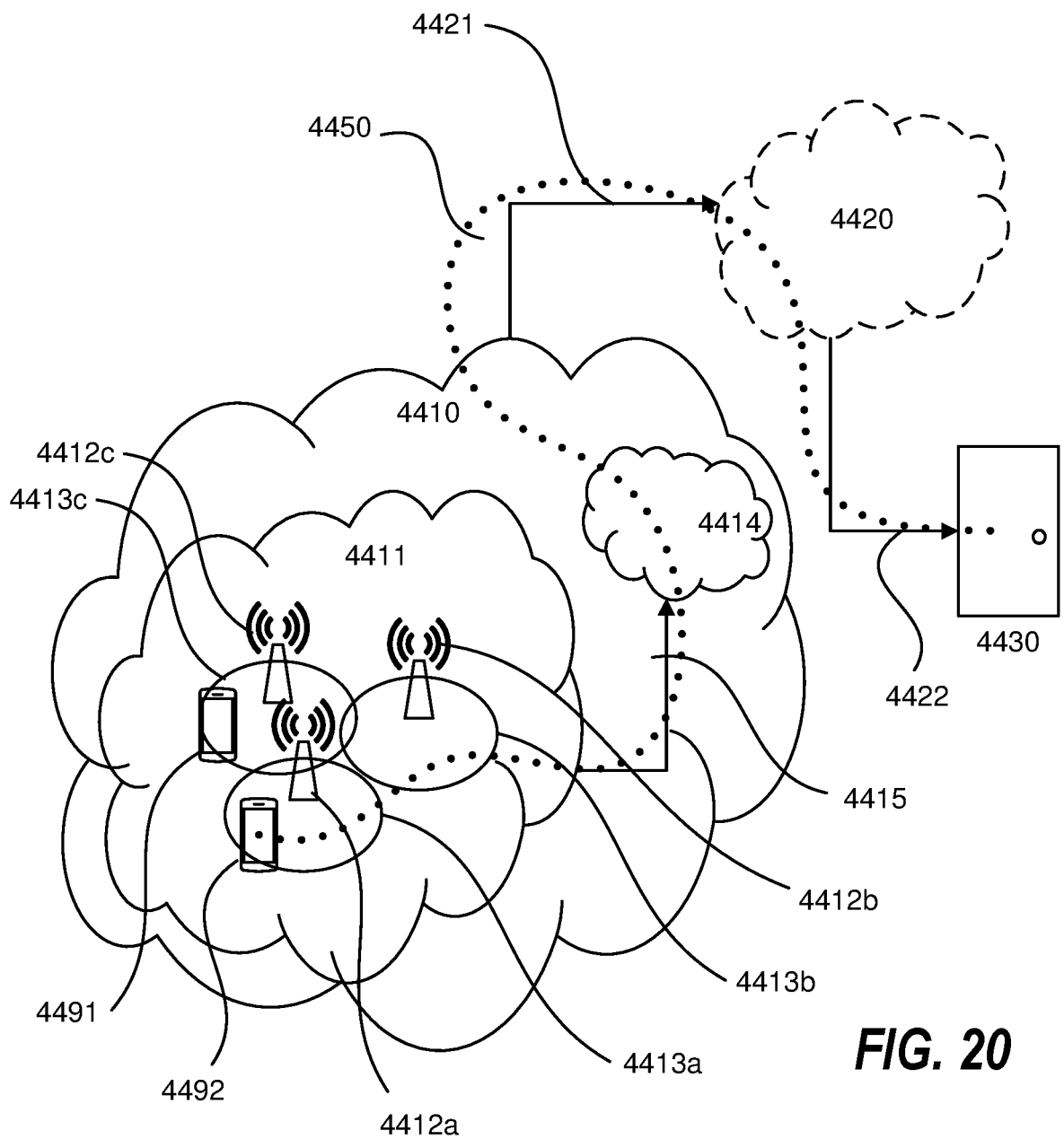
FIG. 20 is a block diagram of a telecommunication network connected via an intermediate network to a host computer in accordance with some embodiments.

FIG. 20: Telecommunication network connected via an intermediate network to a host computer in accordance with some embodiments.

With reference to FIG. 20, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 20 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 21:
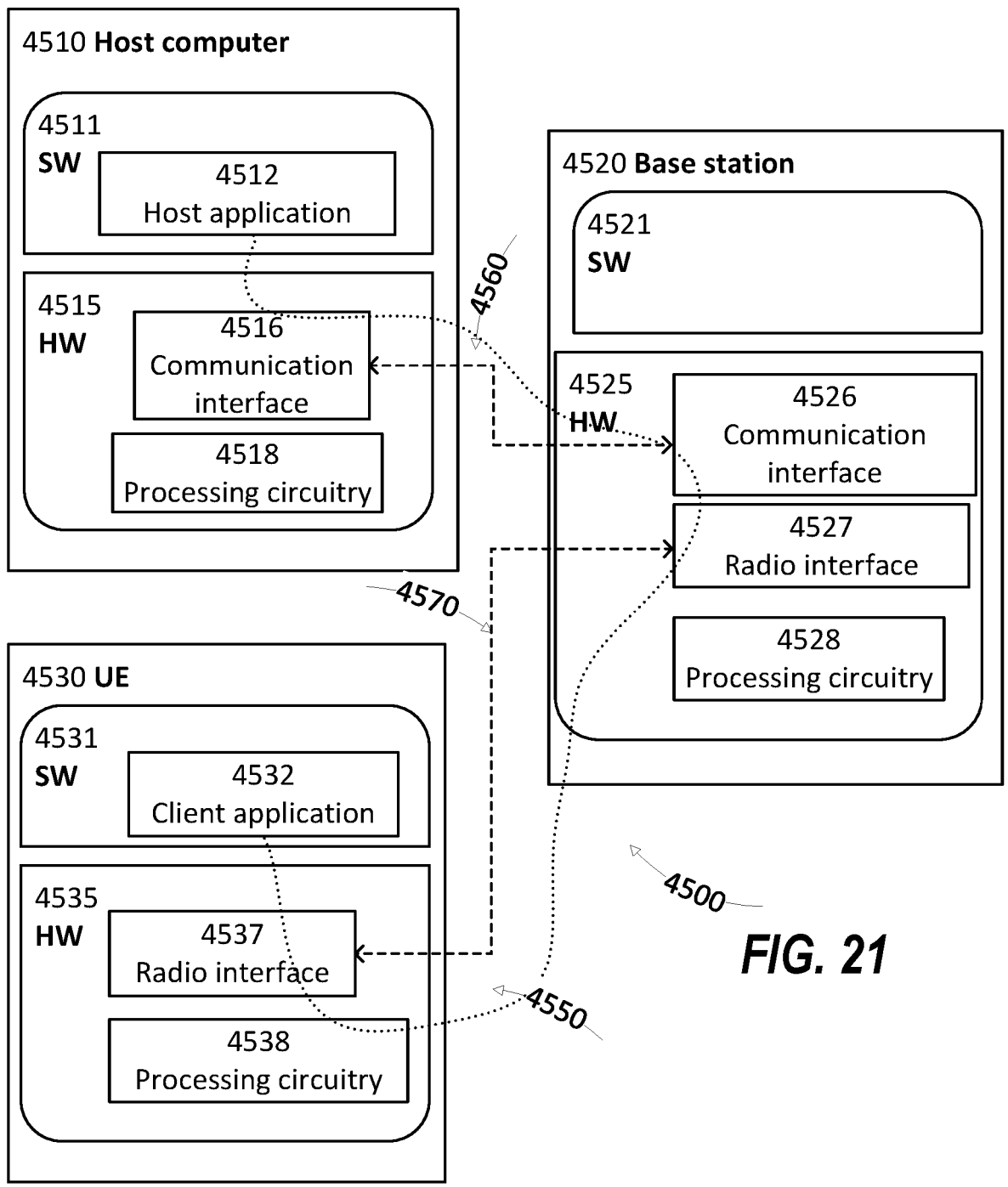
FIG. 21 is a block diagram of a host computer communicating via a base station with a user equipment over a partially wireless connection in accordance with some embodiments.

FIG. 21: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 21. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 21) served by base station 4520. Communication interface 4526 may be configured to facilitate connection 4560 to host computer 4510. Connection 4560 may be direct or it may pass through a core network (not shown in FIG. 21) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 21 may be similar or identical to host computer 4430, one of base stations 4412a, 4412b, 4412c and one of UEs 4491, 4492 of FIG. 20, respectively. This is to say, the inner workings of these entities may be as shown in FIG. 21 and independently, the surrounding network topology may be that of FIG. 20.

In FIG. 21, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 22:
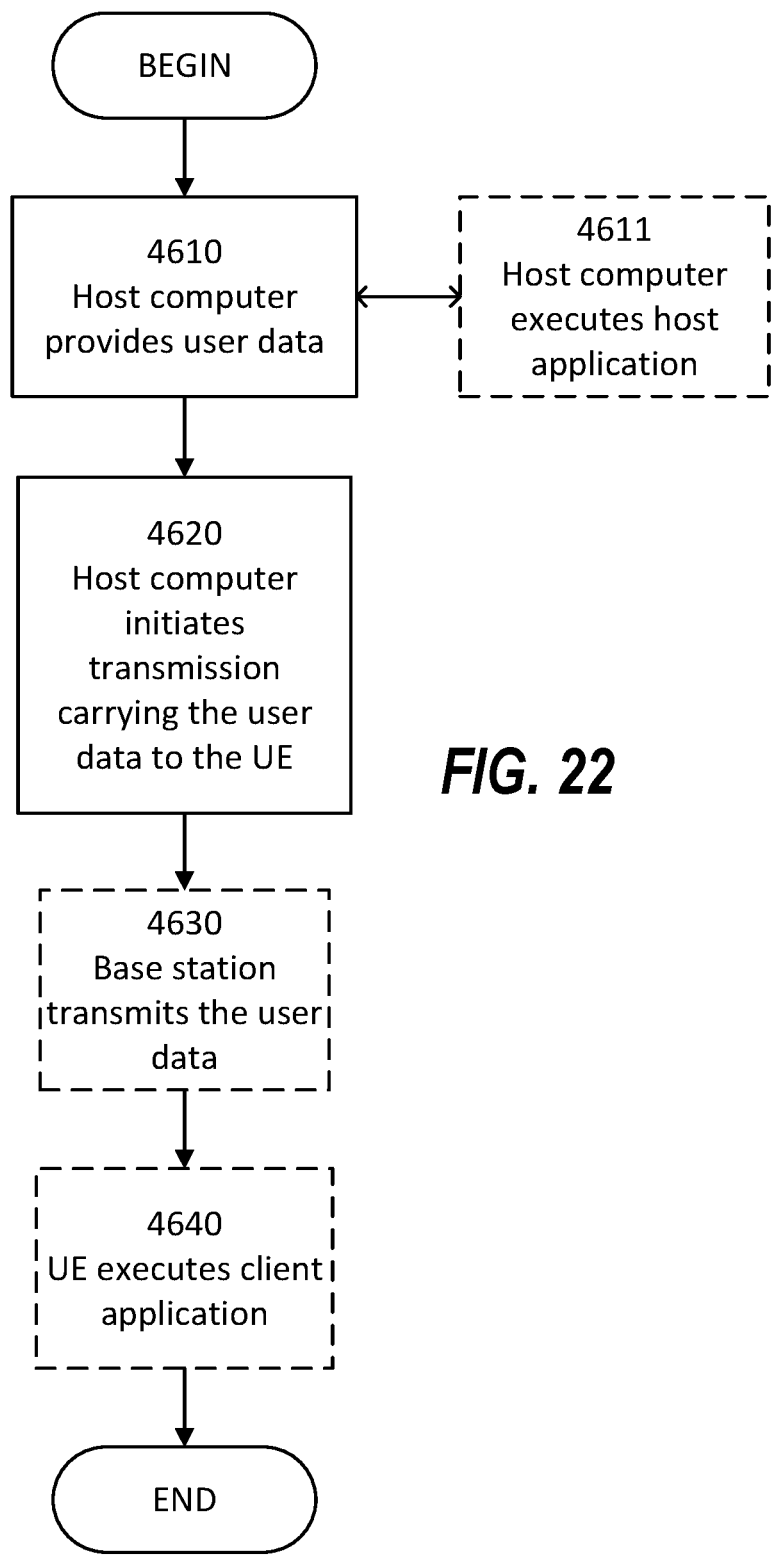
FIG. 22 is a block diagram of methods implemented in a communication system including a host computer, a base station and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 23:
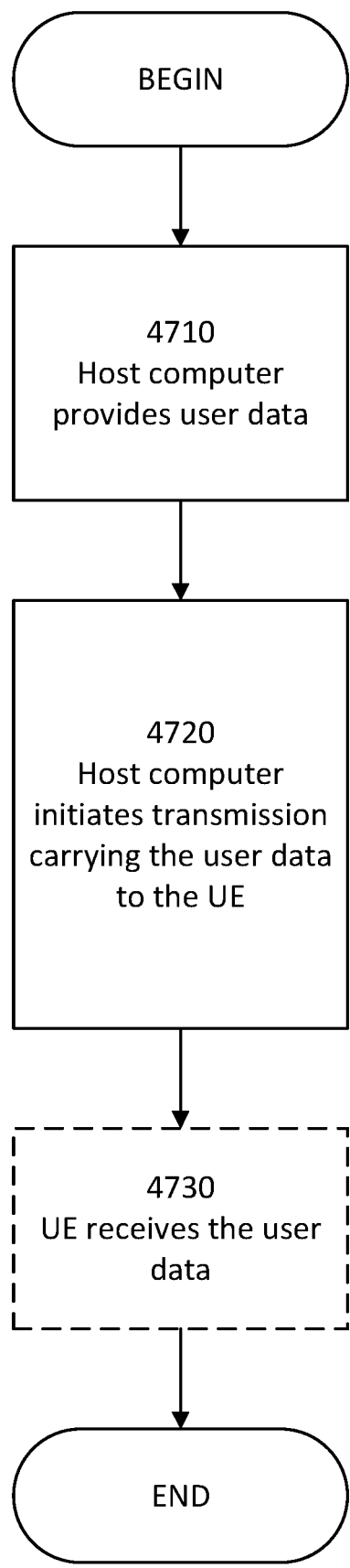
FIG. 23 is a block diagram of methods implemented in a communication system including a host computer, a base station and a user equipment in accordance with some embodiments.

FIG. 23: Methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 24:
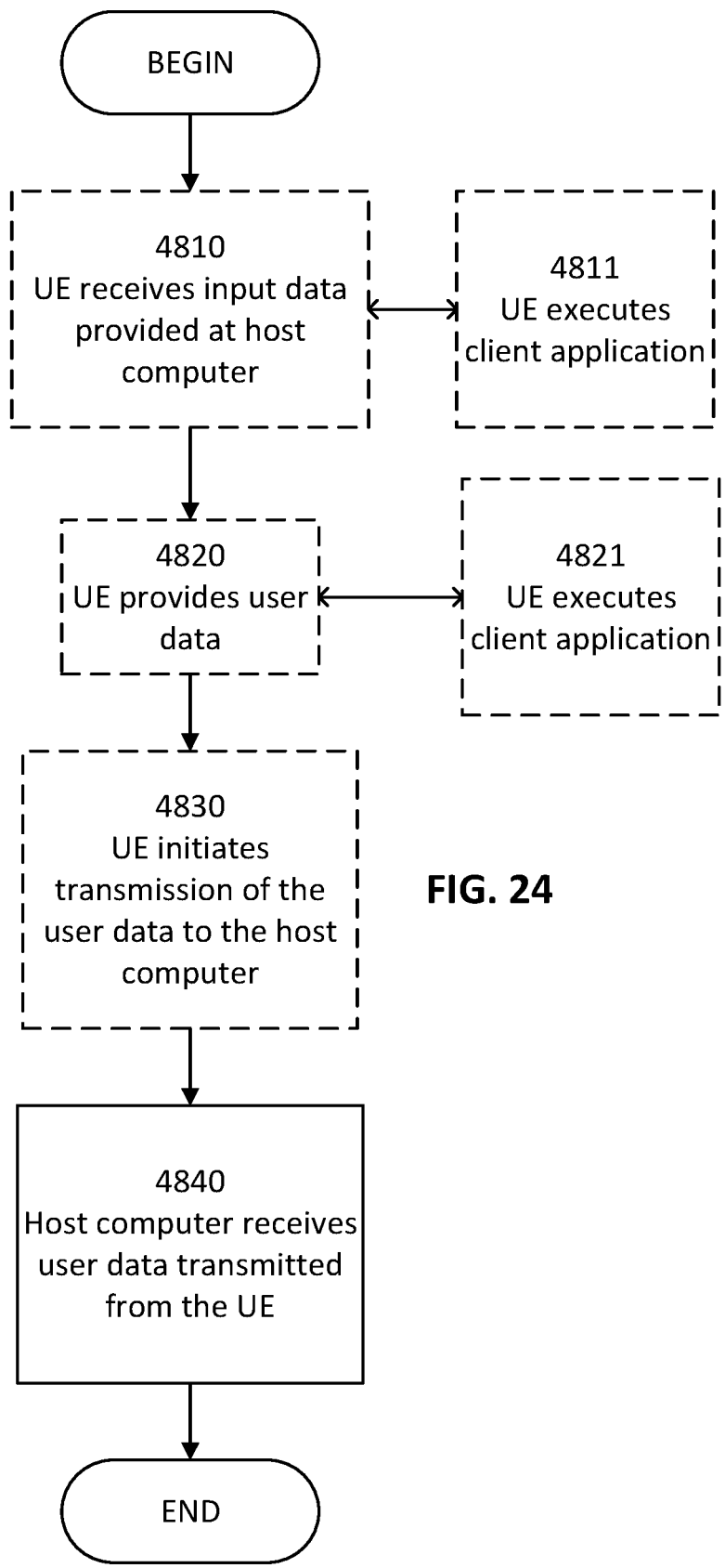
FIG. 24 is a block diagram of methods implemented in a communication system including a host computer, a base station and a user equipment in accordance with some embodiments.

FIG. 24: Methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 25:
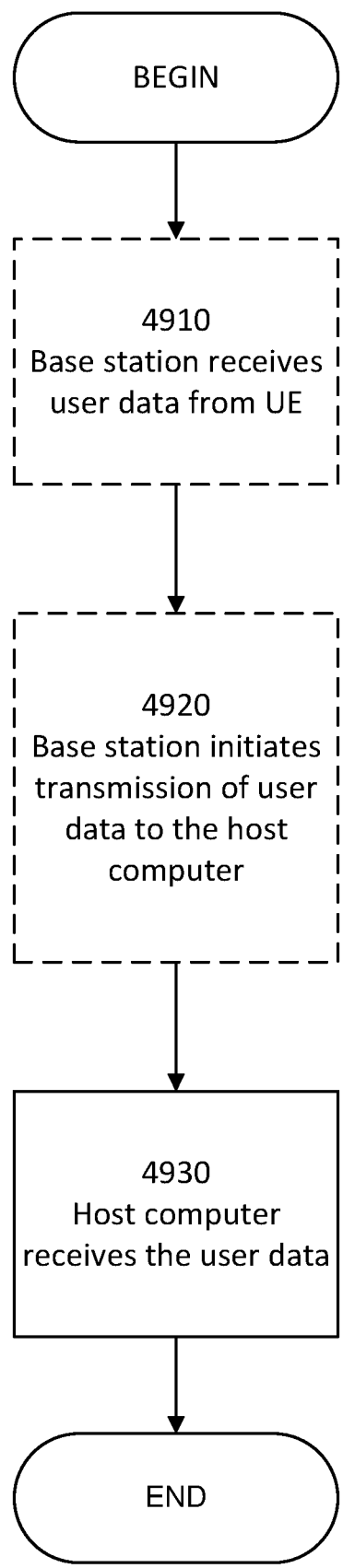
FIG. 25 is a block diagram of methods implemented in a communication system including a host computer, a base station and a user equipment in accordance with some embodiments.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Definitions are Provided Below

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method by a first integrated access and backhaul, IAB, node for securely communicating with at least one second IAB node, the method comprising:
   establishing a secure connection with a node of a network;
   receiving, from the node, a message indicating a secure messaging protocol to use to communicate with the at least one second IAB node, the message including at least one nonce;
   transforming a control message to be sent to the at least one second IAB node into a secure control message using the secure messaging protocol;
   transmitting the secure control message to the at least one second IAB node;
   the secure messaging protocol including a protocol using the at least one nonce, using the secure messaging protocol to transmit the control message to the at least one second IAB node including:
      using a nonce of the at least one nonce to protect an integrity of the control message being transmitted to the at least one second IAB node; and
      transmitting the secure control message with the nonce to the at least one second IAB node; and
   using the nonce to protect the integrity of the control message including:
      calculating a message authentication code - integrity, MAC-I, using a value of the nonce; and
      using the MAC-I in a pre-defined algorithm.

2. The method of claim 1, wherein establishing the secure connection with the node comprises establishing the secure connection with one of a central unit, CU, node of the network or an operation and maintenance, OAM, node of the network.

3. The method of claim 2, wherein the CU node is a donor IAB node.

4. The method of claim 1, wherein establishing the secure connection with the node comprises establishing the secure connection with one of a parent IAB node or a child IAB node.

5. The method of claim 1, wherein the first IAB node comprises one of a parent IAB node, a child IAB node, or a donor IAB node and the at least one second IAB node comprises one of a parent IAB node, a child IAB node, or a donor IAB node.

6. The method of claim 1, wherein using the nonce to protect the integrity of the control message comprises:
   including a value of the nonce in the secure control message.

7. The method of claim 1, further comprising receiving the pre-defined algorithm.

8. The method of claim 1, wherein the at least one nonce comprises a set of nonces and each of a plurality of the set of nonces is associated with a different message.

9. The method of claim 8, wherein each of the plurality of the set of nonces is associated with one of: a nonce for an IAB flow control stop uplink, UL, flow message to a child IAB node, a nonce for an IAB flow control resume UL flow message to the child IAB node, a nonce for a backhaul failure detection indication to the child IAB node, a nonce for a backhaul failure recovery indication to the child IAB node, or a nonce for a failure to recovery backhaul link indication to the child IAB node.

10. The method of claim 1, wherein the message includes a key, and the secure messaging protocol comprises a protocol using at least one of a seed or the key, and wherein using the secure messaging protocol to transmit the control message to the at least one second IAB node comprises:
   using the at least one of the seed or the key for securing the control message to be transmitted to the at least one second IAB node;
   calculating a message authentication code—integrity, MAC-I, to include in an adaptation layer packet using a function based on at least the key, a message direction, the control message to be protected, and message type;
   adding the MAC-I to the control message; and
   transmitting the secure control message with the MACI-I to the at least one second IAB node.

11. The method of claim 10, wherein using the at least one of the seed or the key for securing the control message to be transmitted to the at least one second IAB node comprises using the at least one of the seed or the key to derive a next key for securing the control message to be transmitted to the at least one second IAB node, and calculating the MAC-I to include in the adaptation layer packet using the function based on at least the key, the message direction, the control message to be protected, and the message type comprises calculating the MAC-I to include in the adaptation layer packet using the function based on the next key, the message direction, the control message to be protected, and the message type.

12. The method of claim 10 further comprising:
   using a sequence number associated with the control message; and
   wherein calculating the MAC-I to include in an adaptation layer packet uses a function based on at least one of:
   the key or the next key;
   the message direction;
   the control message to be protected;
   the message type; or the sequence number.

13. The method of claim 12, wherein each message type has a sequence number.

14. The method of claim 1, wherein the secure messaging protocol comprises a protocol using a reverse hash chain.

15. The method of claim 1, wherein the secure messaging protocol comprises a protocol using public/private key pairs.

16. An integrated access and backhaul, IAB, node for securely communicating with at least one second IAB node, the IAB node comprising:
 a processor; and
 a memory storing instructions that, when executed by the processor, cause the IAB node to perform operations comprising:
  establishing a secure connection with a node of a network;
  receiving, from the node, a message indicating a secure messaging protocol to use to communicate with the at least one second IAB node, the message including one of at least one nonce or a key;
  transforming a control message to be transmitted to the at least one second IAB node into a secure control message using the secure messaging protocol;
  transmitting the secure control message to the at least one second IAB node;
  the secure messaging protocol including a protocol using the at least one nonce, using the secure messaging protocol to transmit the control message to the at least one second IAB node including:
   using a nonce of the at least one nonce to protect an integrity of the control message being transmitted to the at least one second IAB node; and
   transmitting the secure control message with the nonce to the at least one second IAB node; and
  using the nonce to protect the integrity of the control message including:
   calculating a message authentication code - integrity, MAC-I, using a value of the nonce; and
   using the MAC-I in a pre-defined algorithm.

17. The IAB node of claim 16, wherein establishing the secure connection with the node comprises establishing the secure connection with one of a central unit, CU, node of the network, or an operation and maintenance, OAM, node of the network.

18. The IAB node of claim 17, wherein the CU node is a donor IAB node.

* * * * *